United States Patent
Lee et al.

(10) Patent No.: US 11,383,719 B2
(45) Date of Patent: Jul. 12, 2022

(54) AUTONOMOUS VEHICLE CONTROL METHOD

(71) Applicant: LG Electronics Inc., Seoul (KR)

(72) Inventors: Kyoungha Lee, Seoul (KR); Inyoung Hwang, Seoul (KR); Kangmin Kim, Seoul (KR); Sungil Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 160 days.

(21) Appl. No.: 16/484,033

(22) PCT Filed: May 9, 2019

(86) PCT No.: PCT/KR2019/005524
§ 371 (c)(1),
(2) Date: Aug. 6, 2019

(87) PCT Pub. No.: WO2020/226211
PCT Pub. Date: Nov. 12, 2020

(65) Prior Publication Data
US 2021/0354701 A1    Nov. 18, 2021

(51) Int. Cl.
*B60W 40/08* (2012.01)
*B60W 60/00* (2020.01)
(Continued)

(52) U.S. Cl.
CPC ............ *B60W 40/08* (2013.01); *B60W 10/18* (2013.01); *B60W 30/143* (2013.01);
(Continued)

(58) Field of Classification Search
CPC .................................................. B60W 40/08
See application file for complete search history.

(56) References Cited

U.S. PATENT DOCUMENTS

| 10,343,555 B2 * | 7/2019 | Tan .......................... B60N 2/22 |
| 11,077,771 B2 * | 8/2021 | Urano .................... G06V 20/59 |

(Continued)

FOREIGN PATENT DOCUMENTS

| EP | 0738633 A1 * | 10/1996 | ......... G06K 9/00362 |
| JP | 2002104105 | 4/2002 | |

(Continued)

OTHER PUBLICATIONS

International Search Report in International Appln. No. PCT/KR2019/005524, dated Feb. 5, 2020, 5 pages (with English translation).

*Primary Examiner* — Shelley Chen
(74) *Attorney, Agent, or Firm* — Fish & Richardson P.C.

(57) ABSTRACT

Systems and techniques for vehicle control include controlling a vehicle by associating a seat a passenger in the vehicle is sitting in with the passenger's service use information. The service use information generated after the passenger sits in the first seat may be stored in a first memory corresponding to the first seat. Upon detecting that the passenger has left the first seat and is sitting in a second seat, the service use information may be moved to a second memory corresponding to the second seat. The service use information includes information in the first memory until the passenger leaves the first seat after sitting in the first seat. One or more of an autonomous vehicle according to the present invention, a user terminal, and a server may be associated with artificial intelligence, a robot, augmented reality (AR), virtual reality (VR), etc.

12 Claims, 31 Drawing Sheets

(51) Int. Cl.
  *B60W 10/18* (2012.01)
  *B60W 30/14* (2006.01)
  *B60W 50/14* (2020.01)
(52) U.S. Cl.
  CPC .......... *B60W 50/14* (2013.01); *B60W 60/001* (2020.02); *B60W 2040/0881* (2013.01); *B60W 2050/143* (2013.01); *B60W 2050/146* (2013.01); *B60W 2420/42* (2013.01)

(56) References Cited

U.S. PATENT DOCUMENTS

| | | | | |
|---|---|---|---|---|
| 2012/0235006 | A1* | 9/2012 | Sailer | B60N 2/01 |
| | | | | 248/429 |
| 2014/0253313 | A1* | 9/2014 | Schoenberg | B60N 2/28 |
| | | | | 340/457 |
| 2017/0028881 | A1* | 2/2017 | Proulx | B60N 2/38 |
| 2017/0101011 | A1* | 4/2017 | Hong | B60K 35/00 |
| 2018/0181135 | A1* | 6/2018 | Urano | B60R 25/00 |
| 2018/0218470 | A1 | 8/2018 | Belwafa et al. | |

FOREIGN PATENT DOCUMENTS

| | | | |
|---|---|---|---|
| JP | 2007008289 | | 1/2007 |
| JP | 2007008289 A | * | 1/2007 |
| JP | 2007265161 | | 10/2007 |
| JP | 2007265161 A | * | 10/2007 |
| JP | 4915507 B2 | * | 4/2012 |
| JP | 5736960 B2 | * | 6/2015 |
| JP | 2016225764 | | 12/2016 |
| JP | 2018144544 | | 9/2018 |
| JP | 2018144544 A | * | 9/2018 |
| KR | 20050121571 | | 12/2005 |
| KR | 20150045717 | | 4/2015 |
| KR | 101933606 B1 | * | 12/2018 |

* cited by examiner

AUTONOMOUS VEHICLE CONTROL METHOD

CROSS-REFERENCE TO RELATED APPLICATIONS

This application is a National Stage application under 35 U.S.C. § 371 of International Application No. PCT/KR2019/005524, filed on May 9, 2019, the disclosure of which is hereby incorporated by reference in its entirety.

TECHNICAL FIELD

The present invention relates to a method for controlling an autonomous vehicle.

BACKGROUND ART

A vehicle may be classified as an internal combustion engine vehicle, an external combustion engine vehicle, a gas turbine vehicle, or an electric vehicle depending on the type of motor used.

In recent years, smart vehicles have been actively developed for the safety or convenience of drivers, pedestrians, etc., and active research is ongoing on sensors mounted on smart vehicles. Cameras, infrared sensors, radar, GPS, Lidar, gyroscopes, etc. are being used in smart vehicles, among which cameras serve to substitute for human eyes.

Due to the development of various types of sensors and electronic equipment, vehicles with a function for providing service to a passenger during driving are attracting attention.

Notably, the processing of service use information when a passenger moves to another seat is becoming an issue.

DISCLOSURE

Technical Problem

An aspect of the present invention is to provide a method for controlling a vehicle.

Another aspect of the present invention is to provide a method for storing and keeping service use information when a passenger uses a vehicle's service.

Another aspect of the present invention is to provide a method in which, when a passenger moves to another seat, service use information is moved to the another seat.

Another aspect of the present invention is to provide a method for sensing a passenger's intention of leaving his or her seat and outputting an alarm if leaving his or her seat is dangerous.

Technical Solution

An exemplary embodiment of the present invention provides a vehicle control method, which is a method for controlling a vehicle by associating a seat a passenger in the vehicle is sitting in with the passenger's service use information, the vehicle control method including: detecting the passenger sitting in a first seat; storing the service use information generated after the passenger sits in the first seat in a first memory corresponding to the first seat; detecting the passenger leaving the first seat after the passenger sits in the first seat; detecting the passenger sitting in a second seat after the passenger leaves the first seat; and moving the service use information from the first memory to a second memory corresponding to the second seat and storing the same in the second memory, wherein the service use information includes information that is stored in the first memory until the passenger leaves the first seat after sitting in the first seat.

The detecting of the passenger sitting in the first seat may be performed through at least one of a camera for capturing the inside of the camera, a pressure sensor installed in the first seat, a weight sensor installed in the first seat, and a sensor installed on a safety belt installed in the seat.

The service use information may include at least one of the following: the passenger's profile, the location where the passenger gets in the vehicle, the location where the passenger gets out of the vehicle, the movement path, the history of seat adjustments for the first seat, the history of service use inside the vehicle, the history of product purchases inside the vehicle, the history of payments for paid services, and the history of use of a device installed in the first seat.

The service use information may be updated and stored as the passenger uses a service.

The vehicle control method may further include: extracting a dangerous area based on the vehicle's driving status or the vehicle's driving route; and upon detecting that the passenger has left the first seat and the vehicle has entered the dangerous area, outputting an alarm indicating that leaving the seat is dangerous.

The vehicle control method may further include, upon detecting that the passenger has left the first seat, controlling the vehicle's driving status according to preset criteria The preset criteria may include at least one of the vehicle's speed control, the vehicle's acceleration control, and the vehicle's brake control.

In the vehicle control method, the detecting of the passenger sitting in a second seat after the passenger leaves the first seat may further include performing authentication to ensure that the passenger sitting in the second seat is the same passenger who has left the first seat.

The authentication may be performed through at least one of the camera for capturing the inside of the vehicle, a display device installed on the second seat, and a mobile terminal.

The vehicle control method may further include changing the settings of the second seat based on the service use information.

The vehicle control method may further include, upon detecting that the passenger has left the first seat and is getting closer to a third seat reserved for use by another person, outputting an alarm indicating that the third seat is not available.

The vehicle control method may further include, upon detecting a passenger who is already sitting in the second seat and detecting that the passenger who has left the first seat is sitting in the second seat, keeping the service use information in the first memory.

The vehicle control method may further include, after detecting that the passenger has left the first seat, keeping the service use information in the first memory until the passenger is detected sitting in the second seat.

Advantageous Effects

A vehicle control device according to the present invention has the following advantages.

According to at least one exemplary embodiment of the present invention, it is possible to provide a method for storing and keeping service use information when a passenger uses a vehicle's service.

According to at least one exemplary embodiment of the present invention, it is possible to provide a method in which, when a passenger moves to another seat, service use information is moved to the another seat.

According to at least one exemplary embodiment of the present invention, it is possible to provide a method for sensing a passenger's intention of leaving his or her seat and outputting an alarm if leaving his or her seat is dangerous.

MODE FOR INVENTION

Figure 1:
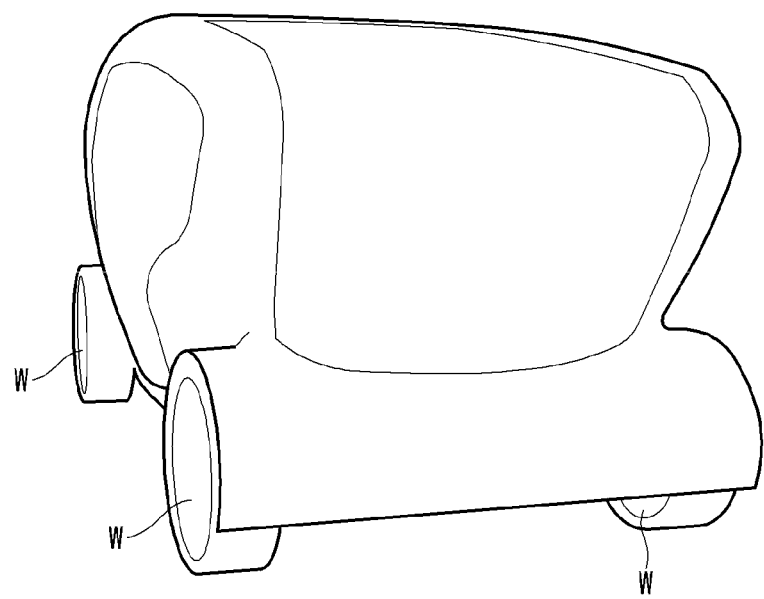
FIG. 1 shows an exterior appearance of a vehicle with a vehicle control device according to an exemplary embodiment of the present invention.
Figure 1:
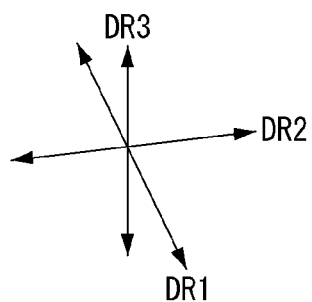

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle as described in this specification may include a car and a motorcycle. Hereinafter, a car will be as an example of a vehicle.

A vehicle as described in this specification may include all of an internal combustion engine vehicle including an engine as a power source, a hybrid vehicle including both an engine and an electric motor as a power source, and an electric vehicle including an electric motor as a power source.

In some implementations, the left of a vehicle means the left of the vehicle in the direction of travel and the right of the vehicle means the right of the vehicle in the direction of travel.

In some implementations, a left hand drive (LHD) vehicle will be assumed unless otherwise stated.

Hereinafter, a user, a driver, a passenger, and a fellow passenger may be used interchangeably depending on the embodiment.

FIG. 1 shows an exterior appearance of a vehicle with a vehicle control device according to an exemplary embodiment of the present invention.

Referring to FIG. 1, the vehicle 700 may include wheels W that rotate by a source of power. A first direction DR1 may be referred to as a forward and backward direction. The vehicle 700 may move forward or backward in the first direction DR1. A second direction DR2 may be perpendicular to the first direction DR1. The second direction DR2 may be referred to as a left and right direction. A third direction DR3 may be perpendicular to the first direction DR1 or second direction DR2. The third direction DR3 may be referred to as an upward and downward direction.

Figure 2:
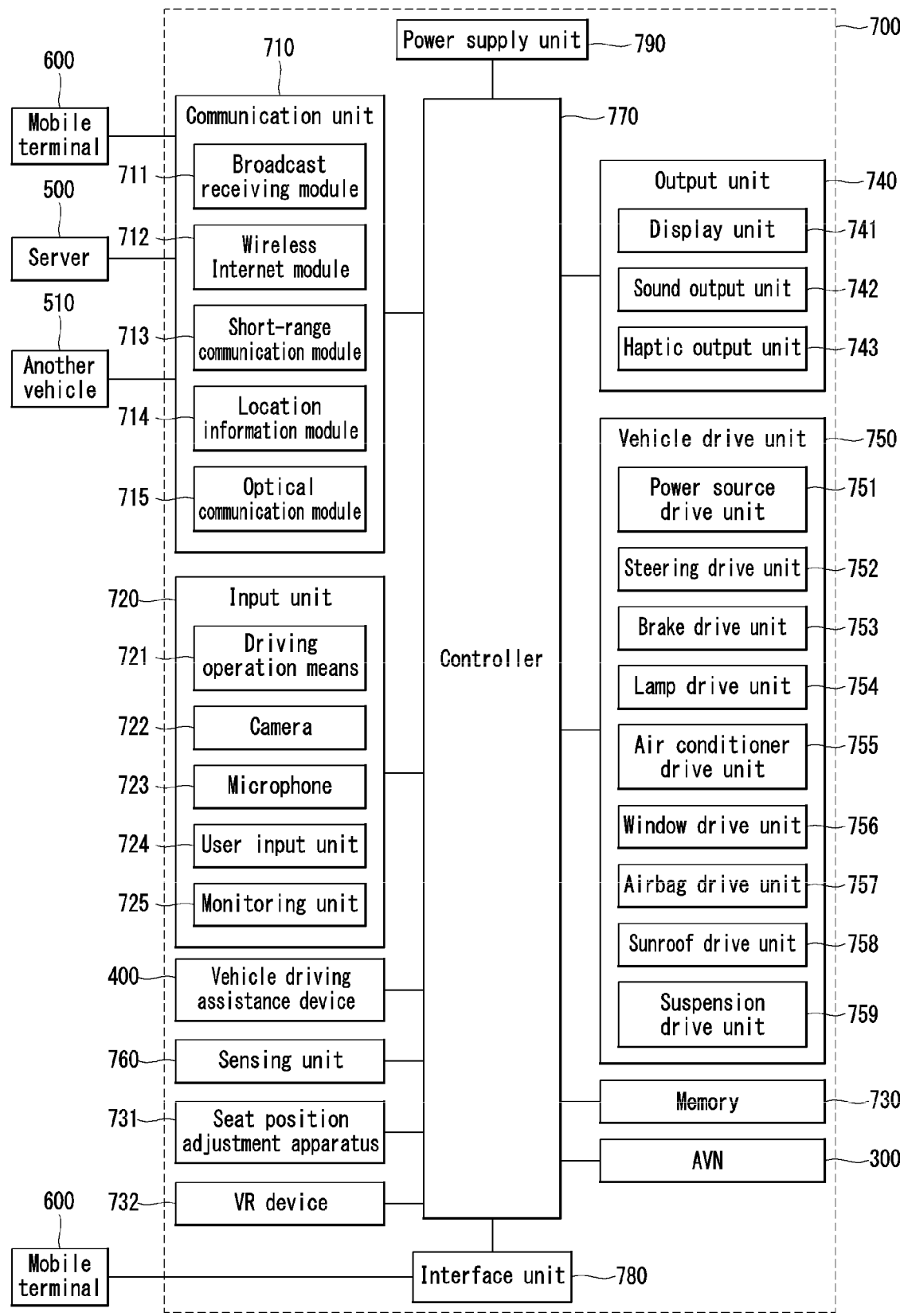
FIG. 2 is an example of an internal block diagram of the vehicle.

FIG. 2 is a block diagram illustrating one example of the vehicle 700 of FIG. 1.

The vehicle may include a communication unit 710, an input unit 720, a sensing unit 760, an output unit 740, a vehicle drive unit 750, a memory 730, an interface unit 780, a controller 770, a power source unit 790, a control device 100, and an AVN apparatus 300. The communication unit 710 may include one or more modules to enable the wireless communication between the vehicle and the mobile terminal 600, between the vehicle and an external server 500, or between the vehicle and another vehicle 510. In addition, the communication unit 710 may include one or more modules to connect the vehicle to one or more networks.

The communication unit 710 may include a broadcast receiving module 711, a wireless Internet module 712, a short-range communication module 713, a location information module 714, and an optical communication module 715.

The broadcast receiving module 711 is configured to receive a broadcast signal or broadcast associated information from an external broadcast managing server via a broadcast channel. Here, broadcast includes radio broadcast or TV broadcast.

The wireless Internet module 712 is a module for wireless Internet access. The wireless Internet module 712 may be internally or externally coupled to the vehicle 700. The wireless Internet module 712 may transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and LTE-A (Long Term Evolution-Advanced). The wireless Internet module 712 may transmit and receive data according to one or more of such wireless Internet technologies, and other Internet technologies as well. For example, the wireless Internet module 712 may exchange data with the external server 500 in a wireless manner. The wireless Internet module 712 may receive weather information and road traffic state information (e.g., Transport Protocol Expert Group (TPEG) information) from the external server 500.

The short-range communication module 713 may assist short-range communication using at least one selected from among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 forms wireless area networks to perform the short-range communication between the vehicle 700 and at least one external device. For example, the short-range communication module 713 may exchange data with the mobile terminal 600 in a wireless manner. The short-range communication module 713 may receive weather information and road traffic state information (e.g., Transport Protocol Expert Group (TPEG) information) from the mobile terminal 600. When the user gets into the vehicle 700, the mobile terminal 600 of the user and the vehicle 700 may pair with each other automatically or as the user executes a pairing application.

The location information module 714 is a module to acquire a location of the vehicle 700. A representative example of the location information module 714 includes a Global Position System (GPS) module. For example, when the vehicle utilizes a GPS module, a location of the vehicle may be acquired using signals transmitted from GPS satellites.

The optical communication module 715 may include a light emitting unit and a light receiving unit.

The light receiving unit may convert light into electrical signals to receive information. The light receiving unit may include Photo Diodes (PDs) to receive light. The photo diodes may convert light into electrical signals. For example, the light receiving unit may receive information regarding a preceding vehicle via light emitted from a light source included in the preceding vehicle.

The light emitting unit may include at least one light emitting element to convert electrical signals into light. Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle 700. For example, the light emitting unit may be at least one selected from among a headlight, a taillight, a brake light, a turn signal light, and a sidelight. For example, the optical communication module 715 may exchange data with another vehicle 510 via optical communication.

The input unit 720 may include a driving operation unit 721, a camera 722, a microphone 723, and a user input unit 724.

The driving operation unit 721 is configured to receive user input for the driving of the vehicle. The driving operation unit 721 may include a steering input unit 721$a$, a shift input unit 721$b$, an acceleration input unit 721$c$, and a brake input unit 721$d$.

The camera 722 may include an image sensor and an image processing module. The camera 722 may process a still image or a moving image acquired by the image sensor (e.g., a CMOS or a CCD). The image processing module may extract required information by processing a still image or a moving image acquired via the image sensor and, then, may transmit the extracted information to the controller 770. Meanwhile, the vehicle 700 may include the camera 722 to capture a forward image or a surround-view image of the vehicle and a monitoring unit 725 to capture an image of the interior of the vehicle.

The monitoring unit 725 may capture an image of a passenger. The monitoring unit 725 may capture an image of biometrics of the passenger.

The microphone 723 may process external sound signals into electrical data. The processed data may be utilized in various ways according to a function that the vehicle 700 is performing. The microphone 723 may convert a user voice command into electrical data. The converted electrical data may be transmitted to the controller 770.

Meanwhile, in some embodiments, the camera 722 or the microphone 723 may be components of the sensing unit 760, other than components of the input unit 720.

The user input unit 724 is configured to receive information from the user. When information is input via the user input unit 724, the controller 770 may control the operation of the vehicle 700 to correspond to the input information.

The user input unit 724 may include a touch input unit or a mechanical input unit. In some embodiments, the user input unit 724 may be located in a region of the steering wheel. In this case, the driver may operate the user input unit 724 with the fingers while gripping the steering wheel.

The sensing unit 760 is configured to sense signals associated with, for example, the traveling of the vehicle 700. To this end, the sensing unit 760 may include a collision sensor, a steering sensor, a speed sensor, gradient sensor, a weight sensor, a heading sensor, a yaw sensor, a gyro sensor, a position module, a vehicle forward/backward movement sensor, a battery sensor, a fuel sensor, a tire sensor, a steering sensor based on the rotation of a steering wheel, a vehicle interior temperature sensor, a vehicle interior humidity sensor, an ultrasonic sensor, an infrared sensor, a radar, and Lidar.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and steering wheel rotation angle information.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric information sensing unit. The biometric information sensing unit is configured to sense and acquire biometric information of the passenger. The biometric information may include fingerprint information, iris-scan information, retina-scan information, hand geometry information, facial recognition information, and voice recognition information. The biometric information sensing unit may include a sensor to sense biometric information of the passenger. Here, the monitoring unit 725 and the microphone 723 may operate as sensors. The biometric information sensing unit may acquire hand geometry information and facial recognition information via the monitoring unit 725.

The output unit 740 is configured to output information processed in the controller 770. The output unit 740 may include a display unit 741, a sound output unit 742, and a haptic output unit 743.

The display unit 741 may display information processed in the controller 770. For example, the display unit 741 may display vehicle associated information. Here, the vehicle associated information may include vehicle control information for the direct control of the vehicle or driver assistance information to guide vehicle driving. In addition, the vehicle associated information may include vehicle state information that notifies a current state of the vehicle or vehicle traveling information regarding the traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle 700 and the user and also function to provide an output interface between the vehicle 700 and the user. In this case, the display unit 741 may include a touch sensor which senses a touch to the display unit 741 so as to receive a control command in a touch manner.

When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like. Hereinafter, a touch or a touch input may generally refer to various types of touches mentioned above.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 741 may be implemented as a Head Up display (HUD). When the display unit 741 is implemented as a HUD, information may be output via a transparent display provided at the windshield. Alternatively, the display unit 741 may include a projector module to output information via an image projected to the windshield.

The sound output unit 742 is configured to convert electrical signals from the controller 770 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control for a power source inside the vehicle 700. For example, in the case where a fossil fuel based engine (not illustrated) is a power source, the power source drive unit 751 may perform electronic control for the engine. As such, the power source drive unit 751 may control, for example, an output torque of the engine. In the case where the power source drive unit 751 is the engine, the power source drive unit 751 may control the speed of the vehicle by controlling the output torque of the engine under the control of the controller 770. In another example, when an electric motor (not illustrated) is a power source, the power source drive unit 751 may perform control for the motor. As such, the power source drive unit 751 may control, for example, the RPM and torque of the motor.

The steering drive unit 752 may include a steering apparatus. As such, the direction of travel of the vehicle may be changed.

The brake drive unit 753 may perform electronic control of a brake apparatus (not illustrated) inside the vehicle 700. For example, the brake drive unit 753 may reduce the speed of the vehicle 700 by controlling the operation of brakes located at wheels. In another example, the brake drive unit 753 may adjust the direction of travel of the vehicle 700 leftward or rightward by differentiating the operation of respective brakes located at left and right wheels.

The lamp drive unit 754 may turn at least one lamp arranged inside and outside the vehicle 700 on or off. The lamp drive unit 754 may include a lighting apparatus. In addition, the lamp drive unit 754 may control, for example, the intensity and direction of light of each lamp included in the lighting apparatus. For example, the lamp drive unit 754 may perform control for a turn signal lamp, a headlamp or a brake lamp.

The air conditioner drive unit 755 may perform the electronic control of an air conditioner (not illustrated) inside the vehicle 700. For example, when the interior temperature of the vehicle 700 is high, the air conditioner drive unit 755 may operate the air conditioner to supply cold air to the interior of the vehicle 700.

The window drive unit 756 may perform the electronic control of a window apparatus inside the vehicle 700. For example, the window drive unit 756 may control the opening or closing of left and right windows of the vehicle 700.

The airbag drive unit 757 may perform the electronic control of an airbag apparatus inside the vehicle 700. For example, the airbag drive unit 757 may control an airbag to be deployed in a dangerous situation.

The sunroof drive unit 758 may perform electronic control of a sunroof apparatus inside the vehicle 700. For example, the sunroof drive unit 758 may control the opening or closing of a sunroof.

The suspension drive unit 759 may perform electronic control on a suspension apparatus (not shown) inside the vehicle 700. For example, when the road surface is uneven, the suspension drive unit 759 may control the suspension apparatus to reduce vibration of the vehicle 700.

The memory 730 is electrically connected to the controller 770. The memory 730 may store basic data for each unit, control data for the operation control of the unit, and input/output data. The memory 730 may be various hardware storage devices such as, for example, a ROM, a RAM, an EPROM, a flash drive, and a hard drive. The memory 730 may store various data for the overall operation of the vehicle 700 such as, for example programs for the processing or control of the controller 770.

The interface unit 780 may serve as a passage for various kinds of external devices that are connected to the vehicle 700. For example, the interface unit 780 may have a port that is connectable to the mobile terminal 600 and may be connected to the mobile terminal 600 via the port. In this case, the interface unit 780 may exchange data with the mobile terminal 600.

Meanwhile, the interface unit 780 may serve as a passage for the supply of electrical energy to the connected mobile terminal 600. When the mobile terminal 600 is electrically connected to the interface unit 780, the interface unit 780 supplies electrical energy from the power source unit 790 to the mobile terminal 600 under the control of the controller 770.

The controller 770 may control the overall operation of each unit inside the vehicle 700. The controller 770 may be referred to as an Electronic Control Unit (ECU).

The controller 770 may execute a function corresponding to an execution signal delivered from the control device 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The power source unit 790 may supply power required to operate the respective components under the control of the controller 770. In particular, the power source unit 790 may receive power from, for example, a battery (not illustrated) inside the vehicle 700.

The AVN apparatus 300 may exchange data with the controller 770. The controller 770 may receive navigation information from the AVN apparatus 300 or a separate navigation apparatus (not illustrated). Here, the navigation information may include set destination information, destination based routing information, and map information or vehicle location information related to vehicle traveling.

The vehicle control device 400 may be understood as included in the vehicle 700.

A seat position adjustment apparatus 731 may be referred to as a seat position adjustment system 731 or seating system 731. The seat position adjustment apparatus 731 may move, tilt, or rotate a seat inside the vehicle 700. The seat position adjustment apparatus 731 may control a seating arrangement by moving, tilting, or rotating a seat inside the vehicle 700.

Figure 3:
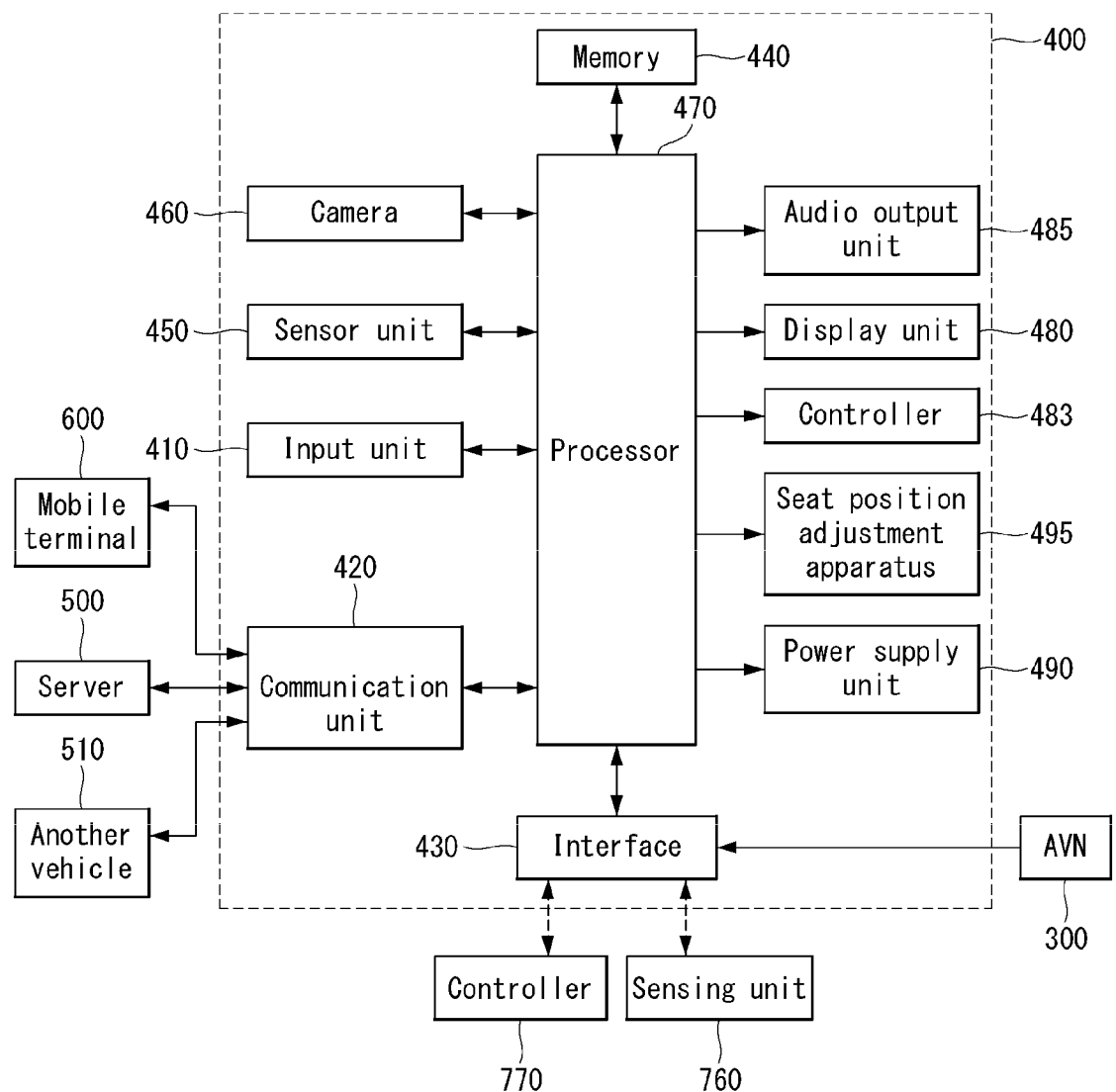
FIG. 3 is an example of an internal block diagram of the vehicle control device according to an exemplary embodiment of the present invention.

FIG. 3 is an example of an internal block diagram of the vehicle control device according to an exemplary embodiment of the present invention.

Referring to FIG. 3, the vehicle control device 400 may include an input unit 410, a communication unit 420, an interface 430, a memory 440 a camera 460, a sensor unit 450, a processor 470, a display unit 480, an audio output unit 485, and a power supply unit 490. The vehicle control device 400 may include additional components in addition to the above-described components, or some of the above-described components may be omitted. Here, units of the same names, among the units included in the vehicle control device 400 and the units included in the vehicle 700 may be included in the vehicle 700 or the vehicle control device 400.

The vehicle control device 400 may include the input unit 410 for receiving user input.

The input unit 410 may include at least one of a gesture input unit (e.g., an optical sensor, etc.) for sensing a user gesture, a touch input unit (e.g., a touch sensor, a touch key, a push key (mechanical key), etc.) for sensing touch, and a microphone for sensing voice input and receive user input.

Next, the vehicle control device 400 may include the communication unit 420 for communicating with another vehicle 510, a terminal 600 and a server 500. The communication unit 420 may be referred to as a wireless communication unit 420.

The vehicle control device 400 may receive communication information including at least one of navigation information, another vehicle 510's traveling information, and traffic information through the communication unit 420. The vehicle control device 400 may send information about the vehicle 700 through the communication unit 420.

The communication unit 420 may receive at least one of position information, weather information and road traffic condition information (e.g., transport protocol experts group (TPEG), etc.) from the mobile terminal 600 and/or the server 500.

The communication unit 420 may receive traffic information from the server 500 having an intelligent traffic system (ITS). Here, the traffic information may include traffic signal information, lane information, vehicle surrounding information or position information.

In addition, the communication unit 420 may receive navigation information from the server 500 and/or the mobile terminal 600. Here, the navigation information may include at least one of map information related to vehicle driving, lane information, vehicle position information, set destination information and route information according to the destination.

For example, the communication unit 420 may receive the real-time position of the vehicle as the navigation information. In detail, the communication unit 420 may include a global positioning system (GPS) module and/or a Wi-Fi (Wireless Fidelity) module and acquire the position of the vehicle.

In addition, the communication unit 420 may receive driving information of another vehicle 510 from the another vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the vehicle control device 400 may pair with each other automatically or by executing a user application.

The communication unit 420 may exchange data with the another vehicle 510, the mobile terminal 600 or the server 500 in a wireless manner. The communication unit 420 may perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit 420 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 420 is configured to facilitate short-range communication. For example, short-range communication may be supported using at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

In addition, the vehicle control device 400 may pair with the mobile terminal located inside the vehicle using a short-range communication method and wirelessly exchange data with the other vehicle 510 or the server 500 using a long-distance wireless communication module of the mobile terminal.

Next, the vehicle control device 400 may include the interface 430 for receiving data of the vehicle 700 and transmitting a signal processed or generated by the processor 470.

The vehicle control device 400 may receive at least one of driving information of another vehicle, navigation information and sensor information via the interface 430. To this end, the interface 430 may perform data communication with at least one of the controller 770 of the vehicle, an audio-video-navigation (AVN) apparatus 300, and the sensing unit 760 using a wired or wireless communication method. The interface 430 may receive navigation information by data communication with the controller 770, the AVN apparatus 300 and/or a separate navigation apparatus. In addition, the interface 430 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor on the basis of rotation of the steering wheel, a vehicle inside temperature sensor, a vehicle inside humidity sensor, a door sensor, etc. The position module may include a GPS module for receiving GPS information.

The interface 430 may receive user input via the user input unit 410 of the vehicle. The interface 430 may receive user input from the input unit of the vehicle or via the controller 770. That is, when the input unit is provided in the vehicle, user input may be received via the interface 430.

In addition, the interface 430 may receive traffic information acquired from the server. The server 500 may be located at a traffic control surveillance center for controlling traffic. For example, when traffic information is received from the server 500 via the communication unit 420 of the vehicle, the interface 430 may receive traffic information from the controller 770.

Next, the memory 440 may store a variety of data for overall operation of the vehicle control device 400, such as a program for processing or control of the processor 470.

In addition, the memory 440 may store data and commands for operation of the vehicle control device 400 and a plurality of application programs or applications executed in the vehicle control device 400. At least some of such application programs may be downloaded from an external server through wireless communication. At least one of such application programs may be installed in the vehicle control device 400 upon release. Such application programs may be stored in the memory 440, and may be executed to perform operation (or function) of the vehicle control device 400 by the processor 470.

The memory 440 may store data for checking an object included in an image. For example, the memory 440 may store data for checking a predetermined object using a predetermined algorithm when the predetermined object is detected from an image of the vicinity of the vehicle acquired through the camera 460. For example, the memory 440 may store data for checking a predetermined object such as a passenger, garbage, or a lost item from an image acquired through the camera 460.

The memory 440 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the vehicle control device 400 may operate in association with a web storage for performing a storage function of the memory 440 over the Internet.

The sensor unit 450 may acquire information on the internal state of the vehicle 700. The sensor unit 450 may sense a thing or object within the vehicle 700. The camera 460 may capture the inside of the vehicle 700. Alternatively, the camera 460 may capture the vicinity of a seat installed in the vehicle. Alternatively, the camera 460 may capture a passenger in the vehicle 700.

The processor 470 may be referred to as a control unit 470 or a controller 470. The processor 470 may detect an object in the vicinity of the vehicle control device 400 through the camera 460. Alternatively, the processor 470 may detect a passenger, a passenger's belongings, or garbage through the camera 460. The processor 470 may control the operation of the vehicle control device 400.

A controller 483 may receive input for controlling the driving of the vehicle 700. The controller 483 may be a part of the input unit 410. For example, the controller 483 may be a jog dial, button, or gesture receiver.

The seat position adjustment apparatuses 731 and 495 may be identical.

Figure 4:
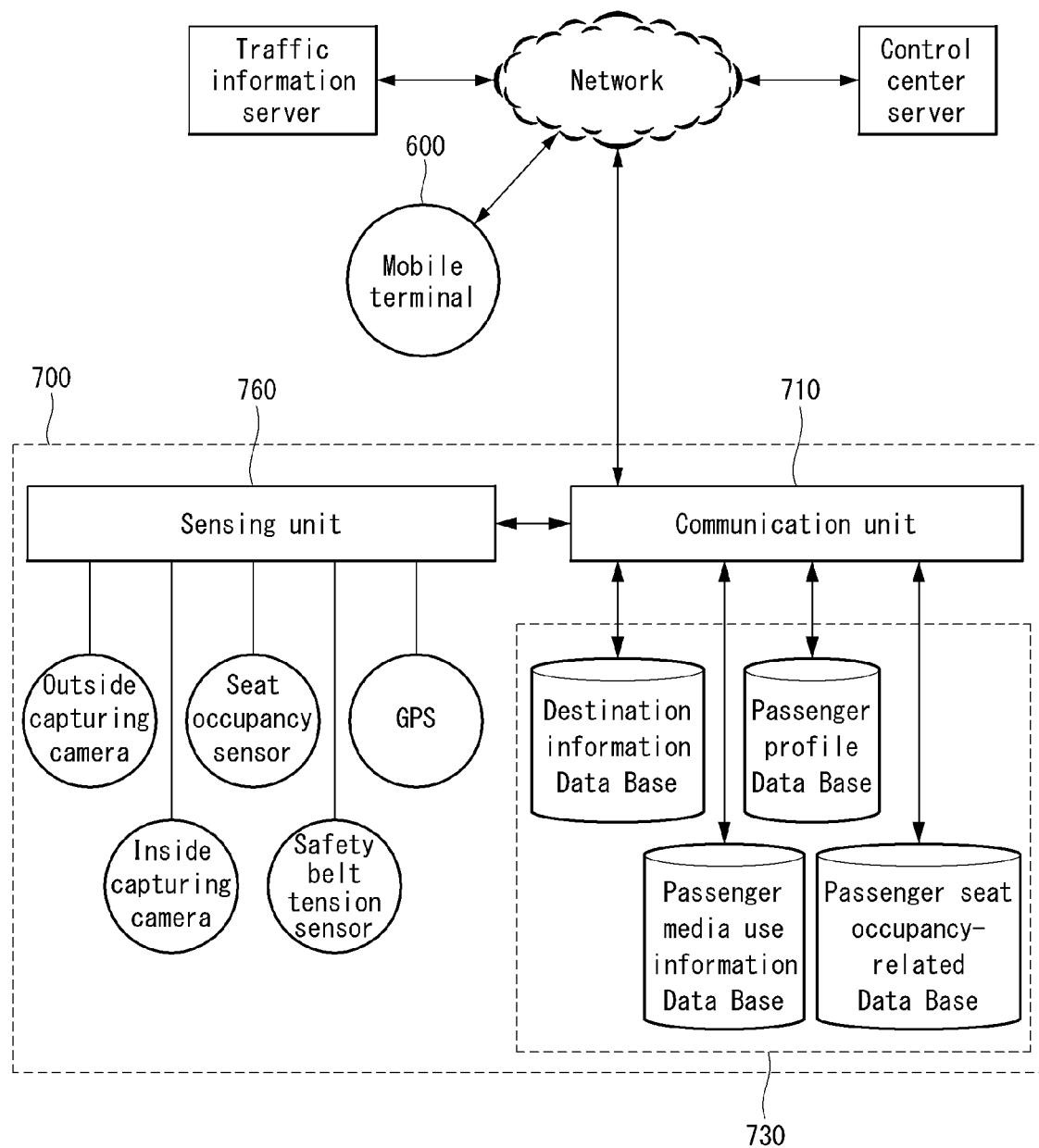
FIG. 4 is a view showing an example of a system according to an exemplary embodiment of the present invention.

FIG. 4 is a view showing an example of a system according to an exemplary embodiment of the present invention.

Referring to FIG. 4, a traffic information server, the mobile terminal 600, a control center server, and the communication unit 710 may establish a network. The traffic information server, the mobile terminal 600, the control center server, a remote control terminal, and the communication unit 710 may exchange information with one another. The traffic information server may provide driving information, traffic information, road information, etc. of another vehicle 510.

The sensing unit 760 of the vehicle 700 may include a camera for capturing the outside of the vehicle 700, a camera for capturing the inside of the vehicle 700, a GPS, a seat occupancy sensor, and a safety belt tension sensor. The seat occupancy sensor may detect whether a passenger is seated. Alternatively, the seat occupancy sensor may detect the weight distribution of a passenger seat or the distribution of pressure on it. The safety belt tension sensor may detect whether a passenger is wearing a safety belt. The GPS may transmit or receive information between the vehicle and a satellite.

The memory 730 may include a destination information database, a passenger profile database, a passenger media use database, and a passenger seat occupancy-related database.

Figure 5:
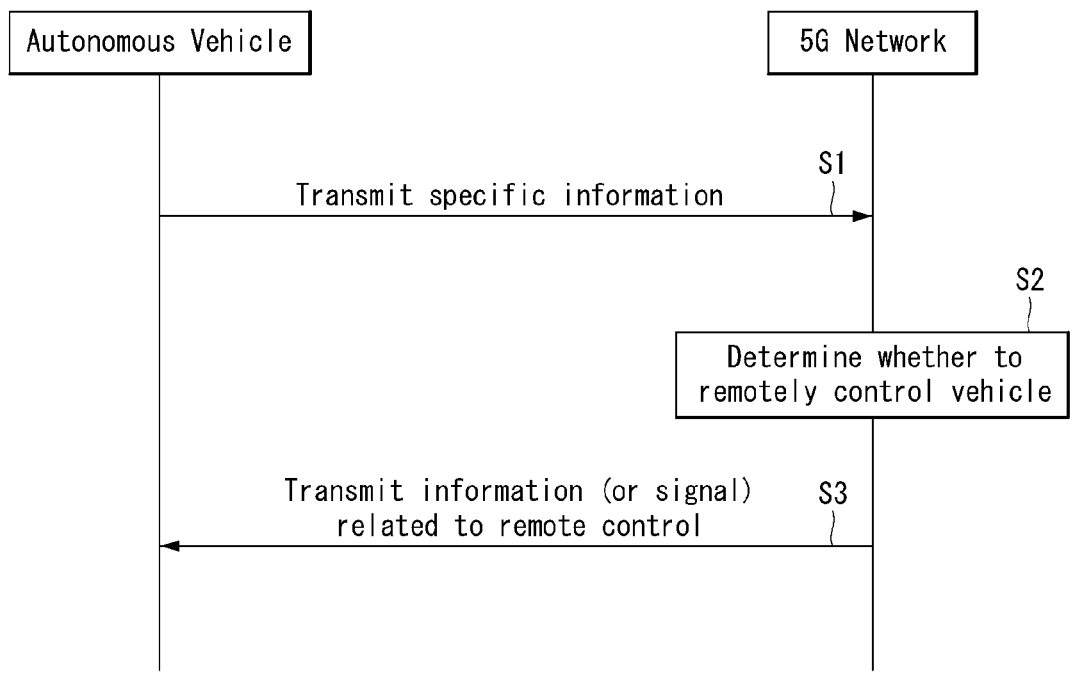
FIG. 5 shows an example of basic operations of an autonomous vehicle and 5G network in a 5G communication system.

FIG. 5 shows an example of basic operations of an autonomous vehicle and 5G network in a 5G communication system.

The autonomous vehicle transmits specific information to a 5G network (S1).

The specific information may include autonomous driving-related information.

The autonomous driving-related information may be information directly related to vehicle driving control. For example, the autonomous driving-related information may include one or more of object data indicating an object around the vehicle, map data, vehicle status data, vehicle location data, and driving plan data.

The autonomous driving-related information may further include service information, etc. that may be provided in an autonomous driving process. For example, the service information may be a passenger's seat use information or a passenger's service use information which is acquired through a camera inside the vehicle. The 5G network may determine whether to remotely control the vehicle (S2).

As stated above, information related to the remote control may be a signal applied directly to the autonomous vehicle, and may further service information provided to a passenger inside the vehicle in an autonomous driving process. In one embodiment of the present invention, the autonomous vehicle may provide passenger management service through the 5G network by matching seat use information of a passenger inside the vehicle and the passenger' service use information. Here, the 5G network may include a server or module that performs autonomous driving-related remote control.

The 5G network may transmit information (or signal) related to remote control to the autonomous vehicle (S3).

Figure 6:
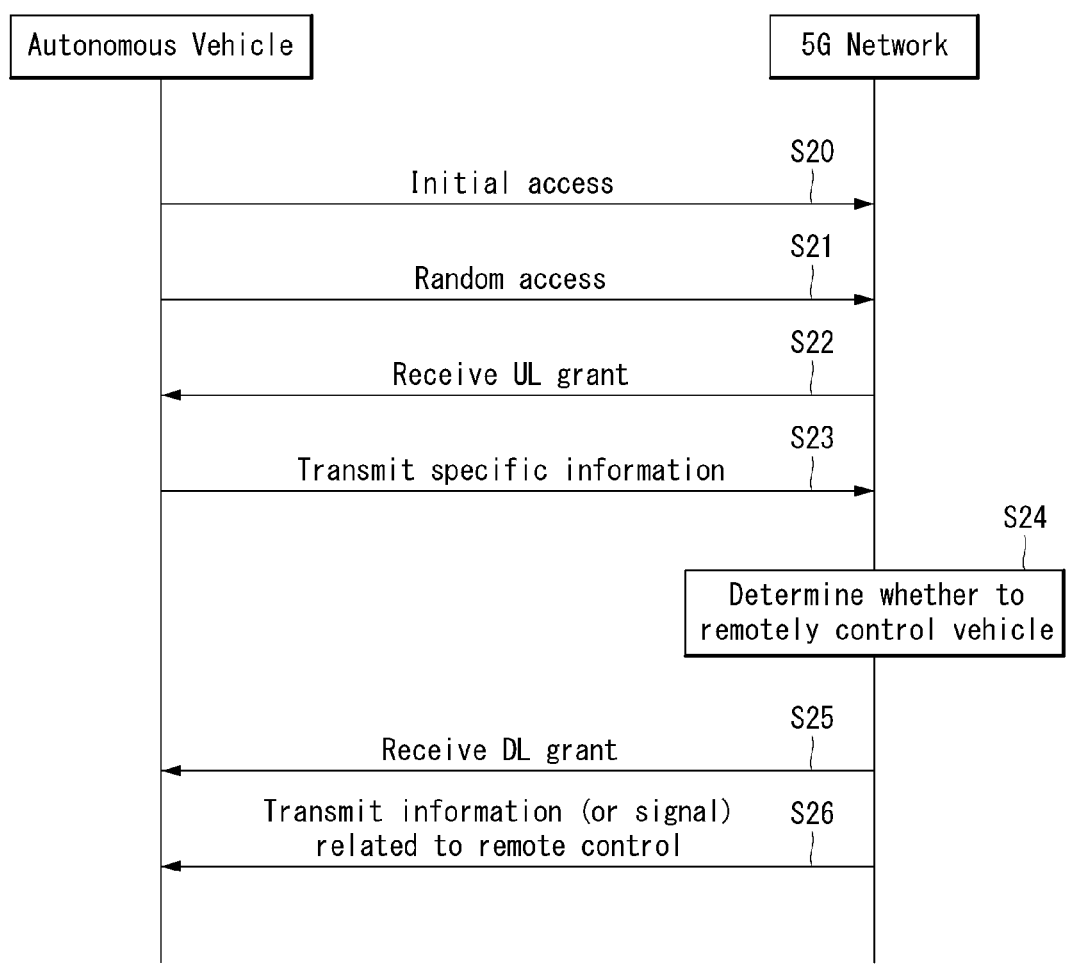
FIG. 6 shows an example of application operations of an autonomous vehicle and 5G network in a 5G communication system.

FIG. 6 shows an example of application operations of an autonomous vehicle and 5G network in a 5G communication system.

The autonomous vehicle performs an initial access procedure with a 5G network (S20).

The initial access procedure may include a cell search for acquiring a downlink (DL) operation, a process of acquiring system information, and so on, which will be described more concretely in the paragraph F.

Then, the autonomous vehicle performs a random access procedure with the 5G network (S21).

The random access process includes preamble transmission and random access response reception processes for acquiring uplink (UL) synchronization or transmitting UL data, which will be described more concretely in the paragraph G.

Then, the 5G network transmits a UL Grant for scheduling transmission of specific information to the autonomous vehicle (S22).

Reception of the UL grant includes a process for time/frequency resource scheduling to transmit UL data, which will be described more concretely in the paragraph H.

Then, the autonomous vehicle transmits specific information to the 5G network based on the UL grant (S23).

Then, the 5G network determines whether to remotely control the vehicle (S24).

Then, the autonomous vehicle receives a DL grant through a physical downlink control channel in order to receive a response to the specific information from the 5G network (S25).

Then, the 5G network transmits information (or signal) related to remote control to the autonomous vehicle based on the DL grant (S26).

Meanwhile, although FIG. 6 illustrates an example of a combination of an initial access process of an autonomous vehicle and 5G communication and/or random access process and a downlink grant reception process through the steps S20 to S26, the present invention is not limited to this.

For example, the initial access process and/or random access process may be performed through the steps S20, S22, S23, S24, and S26. For example, the initial access process and/or random access process may be performed through the steps S21, S22, S23, S24, and S26. Also, a combination of an AI operation and a downlink grant reception process may be performed through the steps S23, S24, S25, and S26.

FIG. 6 illustrates an autonomous vehicle operation through S20 to S26, but the present invention is not limited to this.

For example, the autonomous vehicle operation may be performed by selectively combining S20, S21, S22, and S25 with S23 and S26. Also, for example, the autonomous vehicle operation may consist of S21, S22, S23, and S26. Also, for example, the autonomous vehicle operation may consist of S20, S21, S23, and S26. Also, for example, the autonomous vehicle operation may consist of S22, S23, S25, and S26.

FIGS. 7 to 10 show an example of an autonomous vehicle operation using 5G communication.

Figure 7:
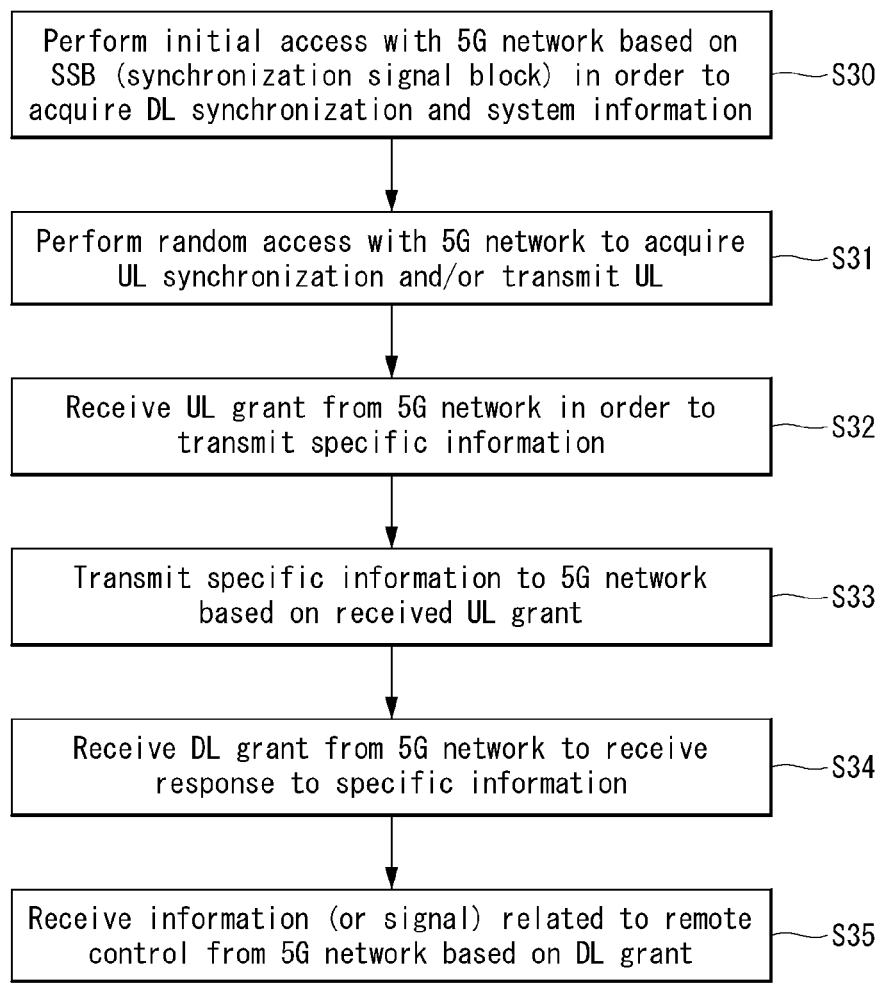
FIGS. 7 to 10 show an example of an autonomous vehicle operation using 5G communication.

First of all, referring to FIG. 7, an autonomous vehicle including an autonomous driving module performs an initial access procedure with a 5G network based on a SSB (synchronization signal block), in order to acquire DL synchronization and system information (S30).

Then, the autonomous vehicle performs a random access procedure with the 5G network to acquire UL synchronization and/or transmit UL (S31).

Then, the autonomous vehicle receives a UL grant from the 5G network in order to transmit specific information (S32).

Then, the autonomous vehicle transmits specific information to the 5G network based on the UL grant (S33).

Then, the autonomous vehicle receives a DL grant from the 5G network to receive a response to the specific information (S34).

Then, the autonomous vehicle receives information (or signal) related to remote control from the 5G network based on the DL grant (S35).

A beam management (BM) process may be added to S30, a beam failure recovery process related to PRACH (physical random access channel) transmission may be added to S31, a QCL relationship may be added to S32 in relation to the direction of beam reception of a PDCCH carrying a UL grant, and a QCL relationship may be added to S33 in relation to the direction of beam transmission of a PUCCH (physical uplink control channel)/PUSCH (physical uplink shared channel) carrying specific information. Also, a QCL relationship may be added to S34 in relation to the direction of beam reception of a PDCCH carrying a DL grant. A more detailed description of this will be given in the paragraph I.

Figure 8:
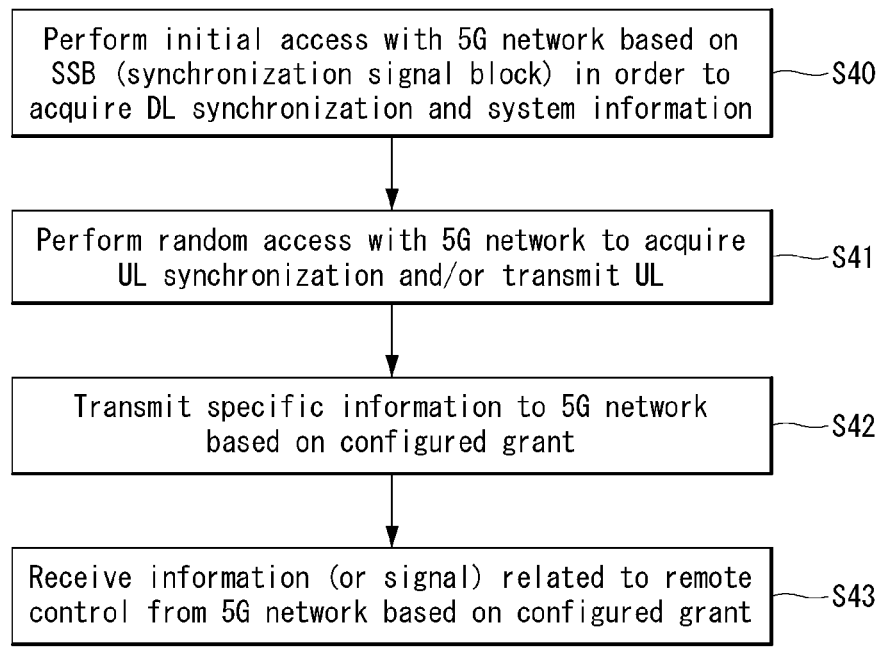

Next, referring to FIG. 8, an autonomous vehicle performs an initial access procedure with a 5G network based on a SSB, in order to acquire DL synchronization and system information (S40).

Then, the autonomous vehicle performs a random access procedure with the 5G network to acquire UL synchronization and/or transmit UL (S41).

Then, the autonomous vehicle transmits specific information to the 5G network based a configured grant (S42). A process of receiving the configured grant, instead of a process of receiving a UL grant from the 5G network, will be described more concretely in the paragraph H.

Then, the autonomous vehicle receives information (or signal) related to remote control from the 5G network based on the configured grant (S43).

Figure 9:
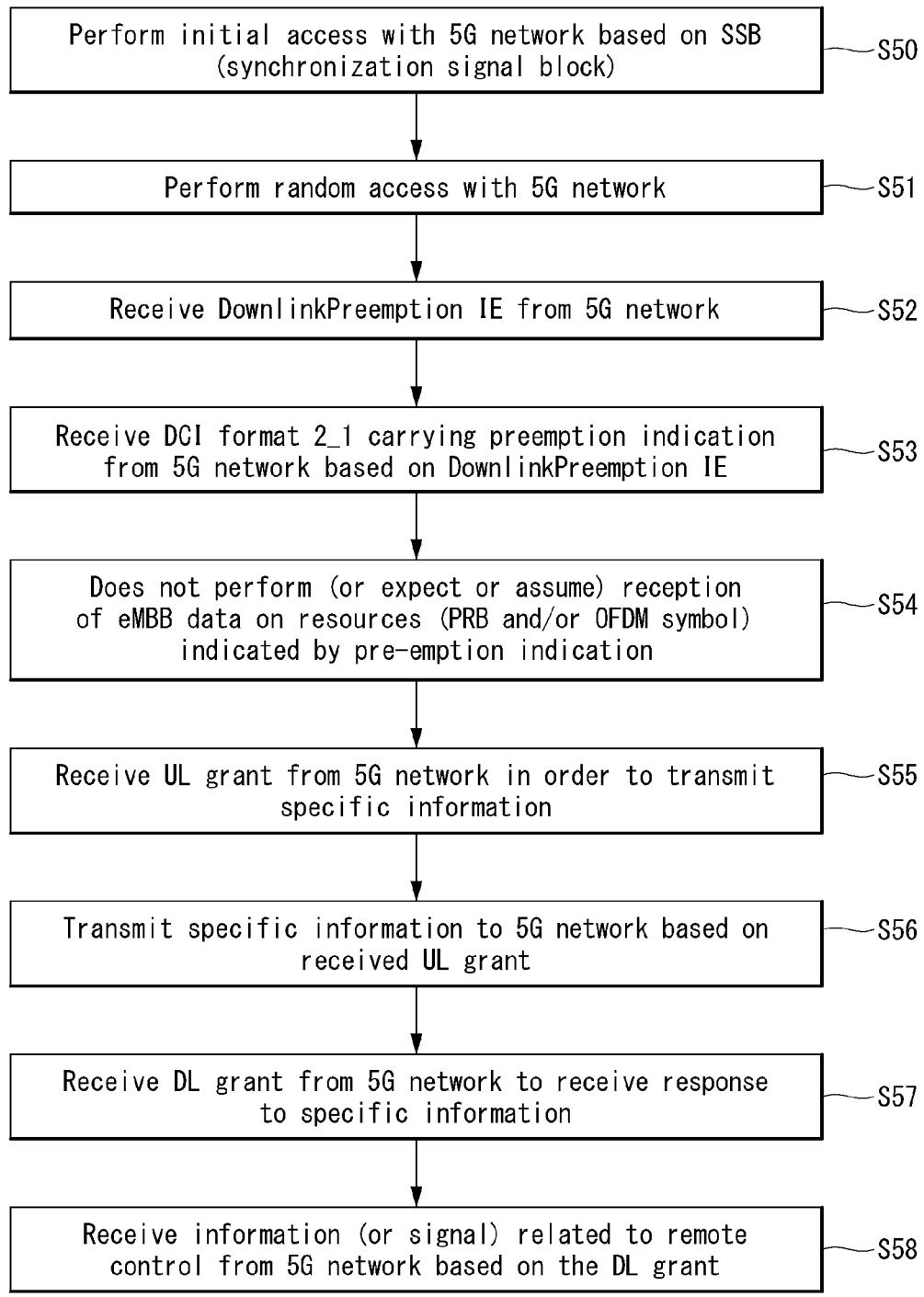

Next, referring to FIG. 9, an autonomous vehicle performs an initial access procedure with a 5G network based on a SSB, in order to acquire DL synchronization and system information (S50).

Then, the autonomous vehicle performs a random access procedure with the 5G network to acquire UL synchronization and/or transmit UL (S51).

Then, the autonomous vehicle receives a DownlinkPreemption IE from the 5G network (S52).

Then, the autonomous vehicle receives a DCI format 2_1 carrying a preemption indication from the 5G network based on the DownlinkPreemption IE (S53).

Then, the autonomous vehicle does not perform (or expect or assume) reception of eMBB data on resources (PRB and/or OFDM symbol) indicated by the pre-emption indication (S54).

An operation related to the preemption indication will be described more concretely in the paragraph J.

Then, the autonomous vehicle receives a UL grant from the 5G network in order to transmit specific information (S55).

Then, the autonomous vehicle transmits specific information to the 5G network based on the UL grant (S56).

Then, the autonomous vehicle receives a DL grant from the 5G network to receive a response to the specific information (S57).

Then, the autonomous vehicle receives information (or signal) related to remote control from the 5G network based on the DL grant (S58).

Figure 10:
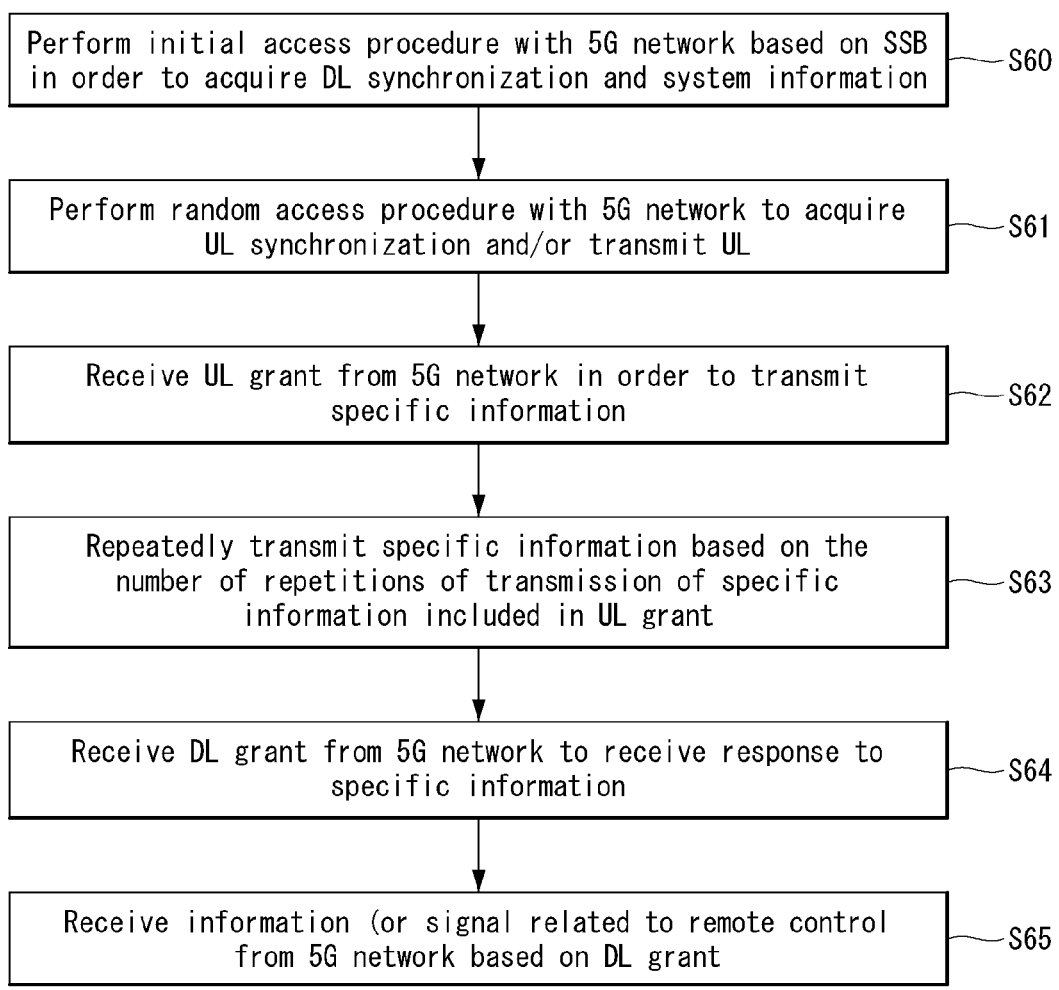

Next, referring to FIG. 10, an autonomous vehicle performs an initial access procedure with a 5G network based on a SSB, in order to acquire DL synchronization and system information (S60).

Then, the autonomous vehicle performs a random access procedure with the 5G network to acquire UL synchronization and/or transmit UL (S61).

Then, the autonomous vehicle receives a UL grant from the 5G network in order to transmit specific information (S62).

The UL grant carries information on the number of repetitions of transmission of the specific information, and the specific information is repeatedly transmitted based on the information on the number of repetitions (S63).

Then, the autonomous vehicle transmits specific information to the 5G network based on the UL grant.

Also, repeated transmission of specific information is performed by frequency hopping, and first specific information may be transmitted on a first frequency resource and second specific information may be transmitted on a second frequency resource.

The specific information may be transmitted over a narrowband of 6RB (Resource Block) or 1RB (Resource Block).

Then, the autonomous vehicle receives a DL grant from the 5G network to receive a response to the specific information (S64).

Then, the autonomous vehicle receives information (or signal) related to remote control from the 5G network based on the DL grant (S65).

One or more of the autonomous vehicle of the present invention and the server may be associated or merged with an artificial intelligence module, an unmanned aerial vehicle (UAV), a robot, an augmented reality (AR) device, virtual reality (VR), a 5G service-related device, and so on.

For example, the autonomous vehicle may operate in association with at least one artificial intelligence (AI) module, robot, etc. included in the vehicle.

For example, the vehicle may interact with at least one robot. The robot may be an autonomous mobile robot (AMR). The mobile robot may move around autonomously and freely and have a plurality of sensors for avoiding obstacles during movement so that it can avoid obstacles. The mobile robot may be a flying robot (e.g., drone) equipped with a flying device. The mobile robot may be a wheeled robot which has at least one wheel and moves by rotating its wheel. The mobile robot may be a legged robot which has at least one leg and moves using the leg.

The robot may function as a device that complements the user's convenience. For example, the robot may perform a function of moving the stuff loaded in the vehicle to the user's final destination. For example, the robot may perform a function of guiding a user who has gotten out of the vehicle to his or her final destination. For example, the robot may perform a function of transporting a user who has gotten out of the vehicle to his or her final destination.

At least one electronic device included in the vehicle may communicate with the robot through a communication device.

At least one electronic device included in the vehicle may provide the robot with data processed by the at least one electronic device included in the vehicle. For example, the at least one electronic device included in the vehicle may provide the robot with at least one of object data indicating an object around the vehicle, map data, vehicle status data, vehicle location data, and driving plan data.

At least one electronic device included in the vehicle may receive data processed by the robot from the robot. The at least one electronic device included in the vehicle may receive at least one of sensing data generated by the robot, object data, robot status data, robot location data, and robot movement plane data.

At least one electronic device included in the vehicle may generate a control signal based further on data received from the robot. For example, the at least one electronic device included in the vehicle may compare information on an object created by an object detection device and information on an object created by the robot, and generate a control signal based on a comparison result. The at least one electronic device included in the vehicle may generate a control signal so as to prevent interference between a vehicle movement path and a robot movement path.

At least one electronic device included in the vehicle may be included in a software module or hardware module (hereinafter, artificial intelligence module) that implements artificial intelligence (AI). The at least one electronic device included in the vehicle may input acquired data into the artificial intelligence module and use data outputted from the artificial intelligence module.

The artificial intelligence module may perform machine learning on input data by using at least one artificial neural network (ANN). The artificial intelligence module may output driving plan data through machine learning on input data.

At least one electronic device included in the vehicle may generate a control signal based on data outputted from the artificial intelligence module.

In some embodiments, at least one electronic device included in the vehicle may receive data processed by artificial intelligence from an external device through a communication device. The at least one electronic device included in the vehicle may generate a control signal based on data processed by artificial intelligence.

Figure 11:
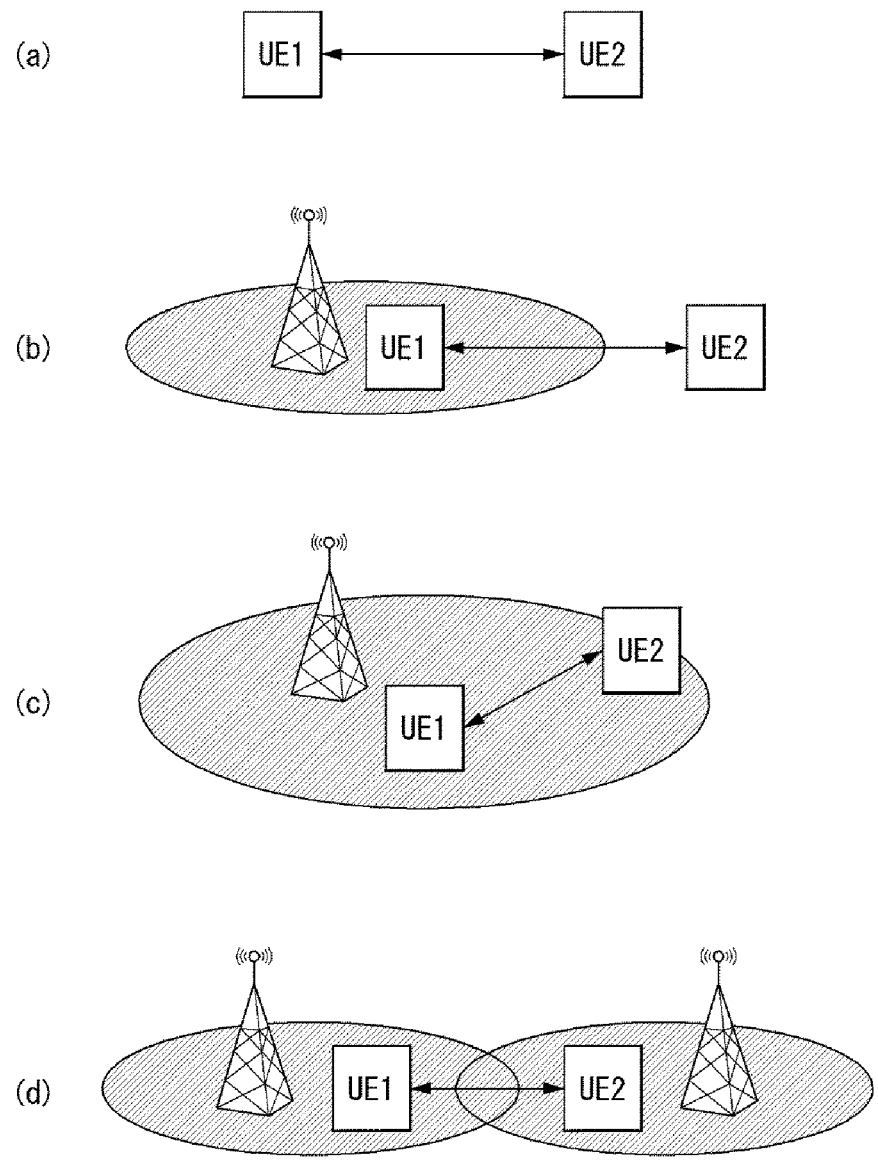
FIG. 11 illustrates various scenarios of sidelink communication.

FIG. 11 illustrates an example of various scenarios of sidelink communication.

Scenarios of sidelink communication may be classified into (1) an out-of-coverage network, (2) a partial-coverage network, and (3) an in-coverage network depending on whether UE1 and UE2 are in cell coverage or out of cell coverage.

The in-coverage network may be divided into an in-coverage-single-cell and an in-coverage-multi-cell according to the number of cells corresponding to the coverage of a BS. (a) of FIG. 11 illustrates an example of an out-of-coverage network scenario of D2D communication. The out-of-coverage network scenario refers to performing sidelink communication between UEs without control of a BS.

In (a) of FIG. 11, only UE1 and UE2 are present, and UE1 and UE2 directly communicate with each other. (b) of FIG. 11 illustrates an example of a partial-coverage network scenario of sidelink communication. The partial-coverage network scenario means performing sidelink communication between a UE located in the network coverage and a UE located out of the network coverage. In (b) of FIG. 11, UE1 located in the network coverage and UE2 located out of the network coverage communicate with each other. (c) of FIG. 11 illustrates an example of an in-coverage-single-cell scenario, and (d) of FIG. 11 illustrates an example of an in-coverage-multi-cell scenario. The in-coverage network scenario means that UEs perform sidelink communication through the control of a BS in the network coverage. In (c) of FIG. 11, UE1 and UE2 are located in the same network coverage (or cell) and perform sidelink communication under the control of a BS. In (d) of FIG. 11, UE1 and UE2 are located in different network coverages. In addition, UE1 and UE2 perform sidelink communication under the control of BSs that manage their network coverages, respectively.

Sidelink transmission may operate in an uplink spectrum in the case of FDD and in an uplink (or downlink) subframe in the case of TDD. For the multiplexing of sidelink transmission and uplink transmission, time division multiplexing (TDM) may be used. Depending on the capability of a UE, sidelink transmission and uplink transmission do not occur simultaneously in a specific UE. For example, sidelink transmission does not occur in an uplink subframe that partially or entirely overlaps an uplink subframe used for uplink transmission. Moreover, sidelink transmission and downlink transmission also do not occur simultaneously. In addition, sidelink transmission and sidelink reception also do not occur simultaneously. The structure of a physical resource used for sidelink transmission may be used equally to the structure of an uplink physical resource. However, the last symbol of a sidelink subframe has a guard period and is not used for sidelink transmission. Sidelink may largely include sidelink discovery, sidelink communication, V2X sidelink communication, and sidelink synchronization.

Sidelink communication is a communication mode in which a UE can perform direct communication through a PC5 interface. This communication mode is supported when a UE is served by an E-UTRAN and when a UE is out of coverage of E-UTRA. In order to perform synchronization for an out-of-coverage operation, a UE(s) may operate as a synchronization source by transmitting a sidelink broadcast control channel (SBCCH) and a synchronization signal.

An SBCCH delivers the most important system information necessary to receive a different sidelink channel and a signal. The SBCCH is transmitted in a fixed period of 40 ms along with a synchronization signal. When a UE is in network coverage, the content of the SBCCH is derived or obtained from a parameter signaled by a BS.

When a UE is out of coverage, if the UE selects another UE as a synchronization criterion, the content of an SBCCH is derived from a received SBCCH. Otherwise, the UE uses a pre-configured parameter.

For an out-of-coverage operation, two pre-configured subframes are present every 40 ms. A UE receives a synchronization signal and SBCCH in one subframe. When the UE becomes a synchronization source based on a defined criterion, it transmits a synchronization signal and SBCCH in another subframe.

A UE performs sidelink communication on defined subframes over the duration of a sidelink control period. The sidelink control period is a period in which resources are allocated to a cell for transmission of sidelink control information and sidelink data. The UE transmits sidelink control information and sidelink data within the sidelink control period.

The sidelink control information indicates a layer 1 ID and transmission characteristics (e.g., MCS, the location of a resource for a sidelink control period, and timing alignment).

Sidelink Radio Protocol Architecture

A UE radio protocol architecture for sidelink communication with respect to a user plane and a control plane will be described.

Figure 12:
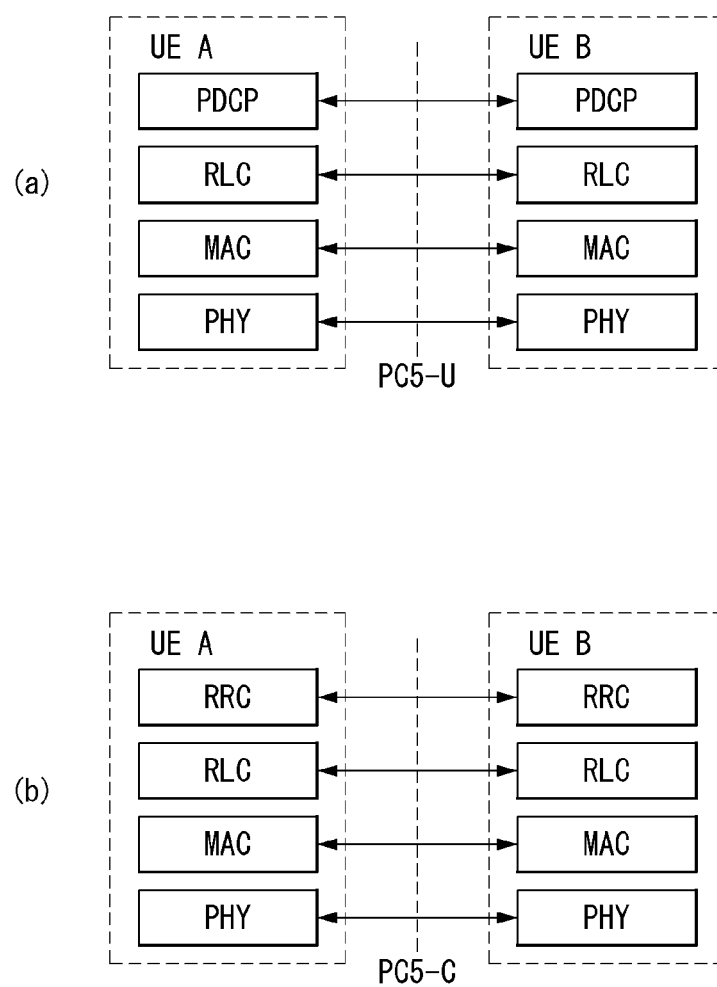
FIG. 12 illustrates a protocol stack for sidelink communication.

FIG. 12 illustrates a protocol stack for sidelink communication.

Specifically, (a) of FIG. 12 illustrates a protocol stack for a user plane in which a PDCP, RLC and MAC sublayer (end in another UE) perform functions on a user plane.

The access layer protocol stack of a PC5 interface includes PDCP, RLC, MAC and PHY as shown in (a) of FIG. 12.

(b) of FIG. 12 illustrates a control plane protocol stack for an SBCCH to which an implementation(s) of the present invention may be applied. An access stratum (AS) protocol stack for the SBCCH in the PC5 interface includes RRC, RLC, MAC, and PHY as shown in (b) of FIG. 12.

Figure 13:
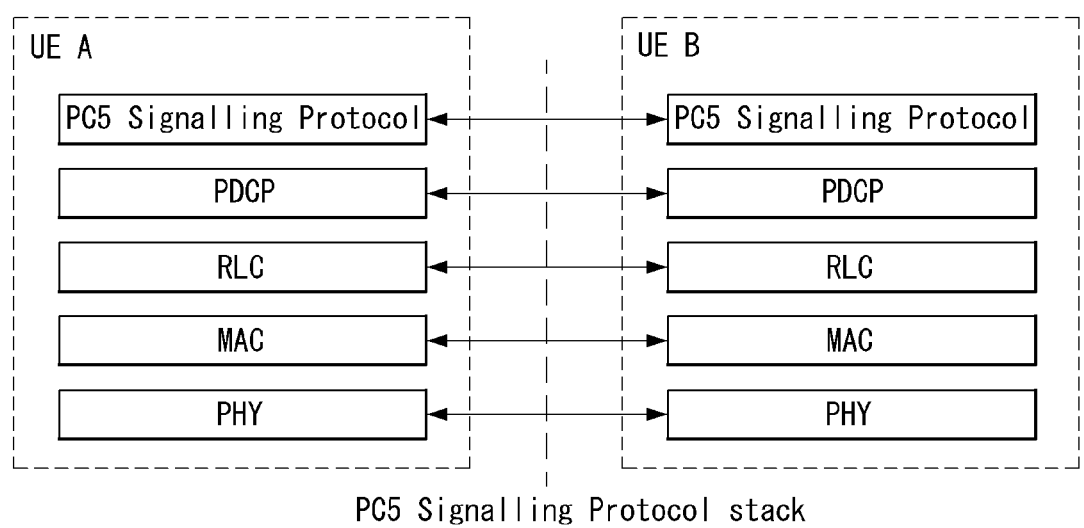
FIG. 13 illustrates a control plane protocol stack for one-to-one sidelink communication.

A control plane for configuring, maintaining and releasing a logical connection for one-to-one sidelink communication is shown in FIG. 13. FIG. 13 illustrates a control plane protocol stack for one-to-one sidelink communication.

A more detailed description of the sidelink protocol stack will be given with reference to 3GPP TS 23.303, 3GPP TS 23.285, 3GPP TS 24.386, etc.

Sidelink Discovery

In sidelink communication, since a plurality of transmitter/receiver UEs are distributed at a given location, a sidelink discovery procedure for confirming the presence of surrounding UEs is necessary before a specific UE perform sidelink communication with the surrounding UEs. Furthermore, sidelink discovery may be used to confirm the presence of surrounding UEs and used for various commercial purposes, such as advertising to UEs within a proximity area, issuing coupons and finding friends, etc.

Sidelink discovery may be applied within network coverage. In this case, a signal (or message) periodically transmitted by UEs for sidelink discovery may be referred to as a discovery message, a discovery signal, a beacon, etc. Hereinafter, a signal periodically transmitted by UEs for sidelink discovery is collectively called a discovery message, for convenience of description.

If UE1 has the role of discovery message transmission, UE 1 transmits a discovery message, and UE2 receives the discovery message. The roles of transmission and reception by UE 1 and UE 2 may be switched. A transmission from UE1 may be received by one or more UE(s), such as UE2.

A discovery message may include a single MAC PDU. In this case, the single MAC PDU may include a UE ID and an application ID.

A physical sidelink discovery channel (PSDCH) may be defined as a channel through which a discovery message is transmitted. The structure of the PSDCH channel may reuse a PUSCH structure.

Two types (sidelink discovery type 1 and sidelink discovery type 2B) may be used as a resource allocation method for sidelink discovery.

In the case of the sidelink discovery type 1, a BS may allocate a resource for discovery message transmission in a non-UE-specific manner. Specifically, a radio resource pool (i.e., discovery pool) for discovery transmission and reception, including a plurality of subframe sets and a plurality of resource block sets, is allocated within a specific period (hereinafter "discovery period"). A discovery transmitter UE randomly selects a specific resource within the radio resource pool and then transmits a discovery message. Such a periodical discovery resource pool may be allocated for discovery signal transmission in a semi-static manner. Configuration information of a discovery resource pool for discovery transmission includes a discovery period, a subframe set which may be used for the transmission of a discovery signal within a discovery period, and resource block set information. Such configuration information of a discovery resource pool may be transmitted to a UE by RRC signaling. In the case of an in-coverage UE, a discovery resource pool for discovery transmission is configured by a BS, and the UE may be notified of the discovery resource pool through RRC signaling (e.g., a system information block (SIB)). The discovery resource pool allocated for discovery within one discovery period can be multiplexed to a time-frequency resource block of the same size through TDM and/or FDM scheme, where the time-frequency resource block of the same size can be called a 'discovery resource'. A discovery resource can be set as one subframe unit and include two resource blocks (RBs) per slot in each subframe. One UE can use one discovery resource for transmission of a discovery MAC PDU. Furthermore, a UE may repeatedly transmit a discovery signal within a discovery period for the transmission of one transport block. The transmission of a MAC PDU transmitted by one UE may be repeated (e.g., repeated four times) contiguously or non-contiguously within a discovery period (i.e., radio resource pool). The number of transmissions of a discovery signal for one transport block may be transmitted by a UE through higher layer signaling. A UE randomly selects the first discovery resource in a discovery resource set which may be used for the repeated transmission of a MAC PDU. Other discovery resources may be determined in relation to the first discovery resource. For example, a specific pattern may be pre-configured, and the next discovery resource may be determined according to the pre-configured pattern based on the location of the first discovery resource selected by a UE. Furthermore, the UE may randomly select each discovery resource within a discovery resource set which may be used for the repeated transmission of a MAC PDU.

In the sidelink discovery type 2, a resource for discovery message transmission is allocated in a UE-specific manner. Type 2 is subdivided into Type 2A and Type 2B. Type 2A is a method in which a BS allocates a resource at each transmission instance of a discovery message by a UE within a discovery period. Type 2B is a method of allocating a resource in a semi-persistent manner. In the case of the sidelink discovery type 2B, a RRC_CONNECTED UE requests the allocation of a resource for the transmission of a sidelink discovery message from a BS through RRC signaling. Furthermore, the BS may allocate the resource through RRC signaling. When the UE makes a transition to an RRC_IDLE state or the BS withdraws resource allocation through RRC signaling, the UE releases the most recently allocated transmission resource. As described above, in the case of the sidelink discovery type 2B, a radio resource may be allocated by RRC signaling, and the activation/deactivation of radio resources allocated by a PDCCH may be determined. radio resource pool for discovery message reception is configured by a BS, and a UE may be notified of the radio resource pool using RRC signaling (e.g., a system information block (SIB)).

A discovery message receiver UE monitors both the discovery resource pools of the sidelink discovery type 1 and type 2 for discovery message reception.

A sidelink discovery method may be divided into a centralized discovery method assisted by a central node, such as a BS, and a distributed discovery method for a UE to confirm the presence of a surrounding UE themselves without the help of the central node. In the case of the distributed discovery method, a dedicated resource, apart from a cellular resource, may be periodically allocated as a resource for a UE to transmit and receive discovery messages.

Sidelink Communication

The application area of sidelink communication includes network edge-of-coverage, as well as in and out of network coverage (in-coverage and out-of-coverage). Sidelink communication may be used for the purpose of public safety (PS), etc.

If UE1 has the role of direct communication data transmission, UE1 transmits direct communication data, and UE2 receives direct communication data. The roles of transmission and reception by UE1 and UE 2 may be switched. A direct communication transmission from UE1 may be received by one or more UE(s), such as UE2.

Sidelink discovery and sidelink communication are not associated with each other, but may be independently defined. That is, in groupcast and broadcast direct communication, sidelink discovery is not necessary. As described above, if sidelink discovery and sidelink direct communication are independently defined, UEs do not need to recognize an adjacent UE. In other words, in the case of groupcast and broadcast direct communication, all receiver UEs within a group do not need to be adjacent to each other.

A physical sidelink shared channel (PSSCH) may be defined as a channel through which sidelink communication data is transmitted. Furthermore, a physical sidelink control channel (PSCCH) may be defined as a channel through which control information for sidelink communication (e.g., scheduling assignment (SA) for sidelink communication data transmission, transmission format) is transmitted. A PSSCH and a PSCCH may reuse a PUSCH structure.

Two modes (Mode 1/Mode 3, Mode 2/Mode 4) may be used as a resource allocation method for sidelink communication.

Here, Mode 3/Mode 4 represents a resource allocation method for V2X sidelink communication, which will be described more concretely in V2X.

Mode 1/Mode 3 refers to a method for a BS to schedule resources used to transmit to a UE data or control information for sidelink communication. In in-coverage, Mode 1 is applied.

A BS configures a resource pool for sidelink communication. The BS may deliver information on a resource pool for sidelink communication to the UE through RRC signaling.

In this case, the resource pool for sidelink communication may be divided into a control information pool (i.e., resource pool for transmitting a PSCCH) and a sidelink data pool (i.e., resource pool for transmitting a PSSCH).

When a transmitter UE requests a BS a resource for transmitting control information and/or data, the BS schedules a control information and sidelink data transmission resource within a pool configured in the transmitter D2D UE using a physical downlink control channel. Accordingly, the transmitter UE transmits control information and sidelink data to a receiver UE using the scheduled (i.e., allocated) resource.

Specifically, the BS may perform scheduling on a resource for transmitting control information (i.e., resource for transmitting a PSCCH) using a downlink control information (DCI) format 5 or a DCI format 5A, and may perform scheduling on a resource for transmitting sidelink data (i.e., resource for transmitting a PSSCH) using a sidelink control information (SCI) format 0 or an SCI format 1. In this case, the DCI format 5 includes some fields of the SCI format 0, and the DCI format 5A includes some fields of the SCI format 1.

In the case of Mode 1/Mode 3, a transmitter UE needs to be in the RRC_CONNECTED state in order to perform sidelink communication. The transmitter UE transmits a scheduling request to a BS. A buffer status report (BSR) procedure, which is a process for reporting the amount of uplink data to be transmitted by a UE, is performed so that the BS can determine the amount of resources requested by the transmitter UE.

When receiver UEs monitor a control information pool and decode control information related to themselves, they may selectively decode sidelink data transmission related to the corresponding control information. The receiver UE may not decode a sidelink data pool based on a result of the decoding of control information.

Figure 14:
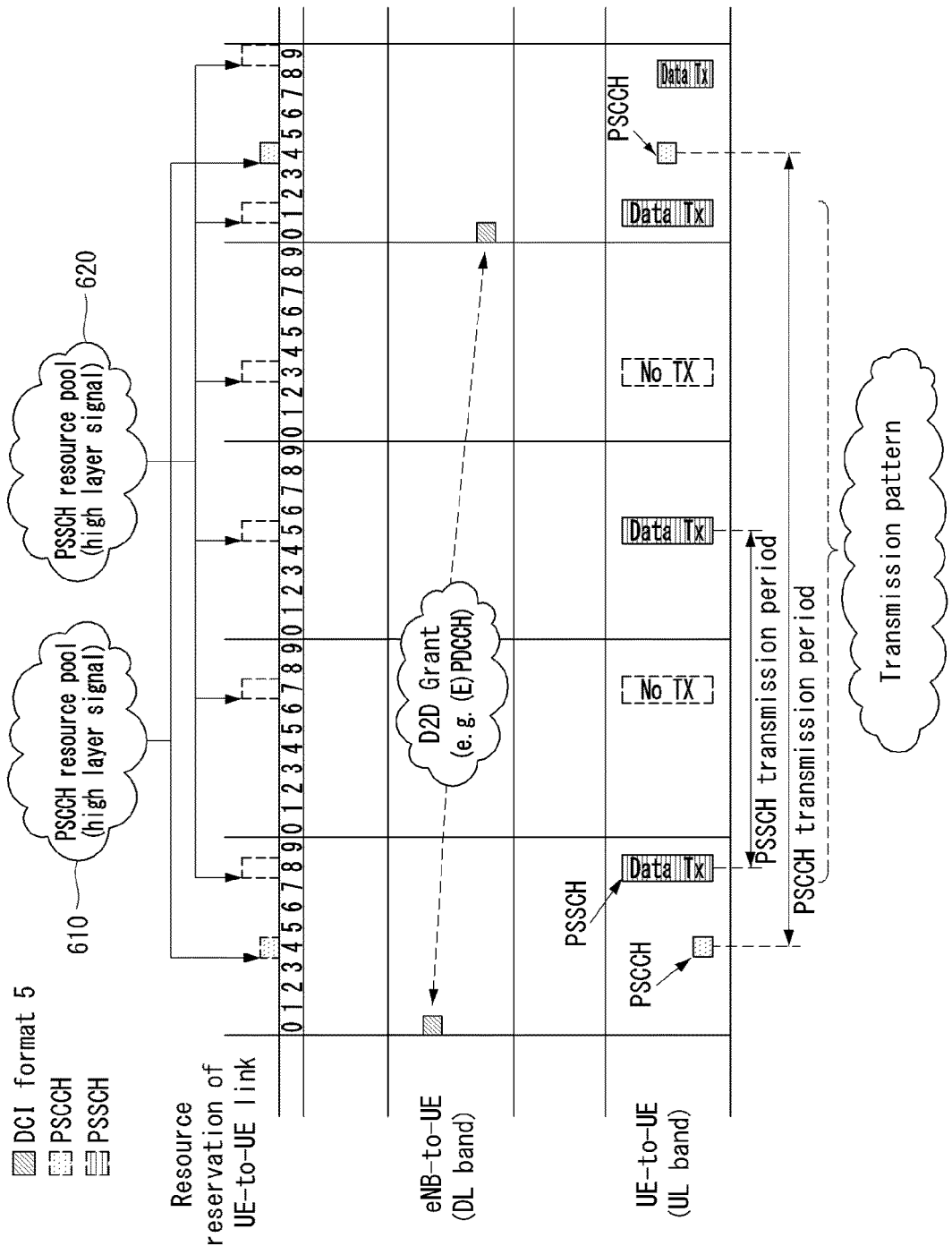
FIG. 14 shows an example of a method of signaling transmission/reception in sidelink communication Mode 1/Mode 3.
Figure 15:
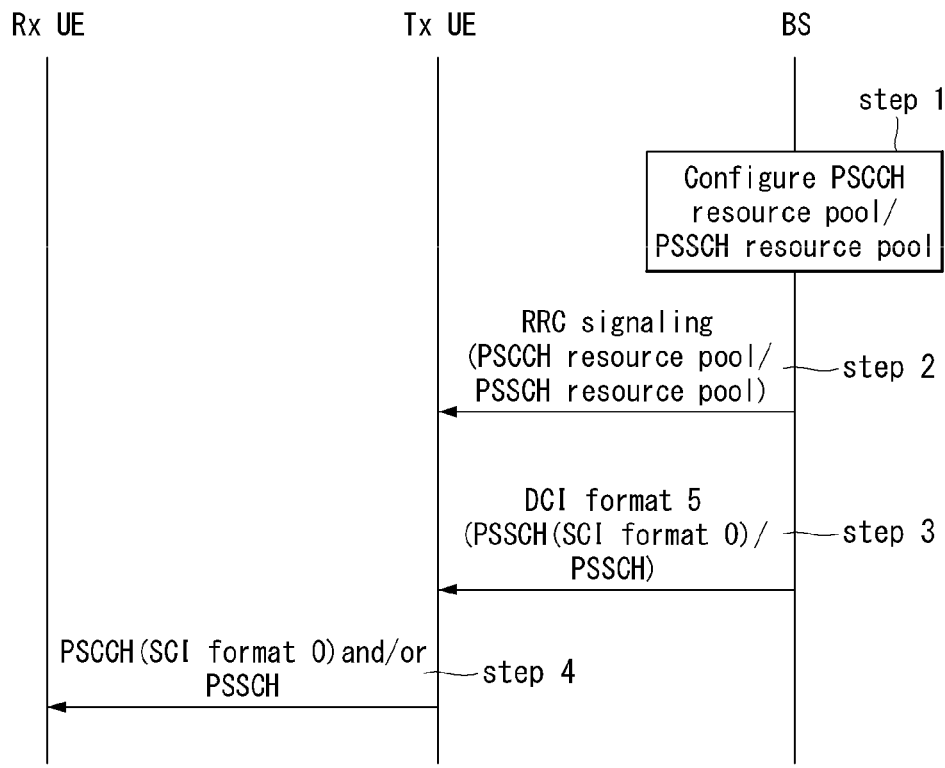
FIG. 15 shows an example of downlink control information transmission for sidelink communication Mode 1/Mode 3.

A detailed example and signaling procedure of the above-described sidelink communication Mode 1/Mode 3 are shown in FIGS. 14 and 15. In this case, as described above, control information related to sidelink communication is transmitted through a PSCCH, and data information related to sidelink communication is transmitted through a PSSCH.

FIG. 14 illustrates a sidelink operation process in a sidelink communication Mode 1/Mode 3 under the control of a BS and a method of performing sidelink communication by transmitting and receiving information related to the sidelink operation process.

As shown in FIG. 14, a PSCCH resource pool 610 and/or PSSCH resource pool 620 related to sidelink communication may be pre-configured. A pre-configured resource pool may be transmitted from a BS to sidelink UEs through RRC signaling. In this case, the PSCCH resource pool and/or the PSSCH resource pool may mean a resource (i.e., dedicated resource) reserved for sidelink communication. In this case, the PSCCH is control information for scheduling the transmission of sidelink data (i.e., PSSCH), and may mean a channel through which the SCI format 0 is transmitted.

Furthermore, the PSCCH is transmitted according to a PSCCH period, and the PSSCH is transmitted according to a PSSCH period. The scheduling of the PSCCH is performed through the DCI format 5 (or DCI format 5A), and the scheduling of the PSSCH is performed through the SCI format 0 (or SCI format 1). The DCI format 5 may be referred to as a sidelink grant.

In this case, the DCI format 5 includes resource information for a PSCCH (i.e., resource allocation information), a transmission power control (TPC) command for a PSCCH and PSSCH, a zero padding (ZP) bit(s) and some fields of the SCI format 0 (e.g., frequency hopping flag, resource block assignment and hopping resource allocation information, and a time resource pattern (e.g., subframe pattern)).

Furthermore, the fields of the SCI format 0 are information related to the scheduling of a PSSCH (i.e., SCI format 0), and includes fields, such as a frequency hopping flag, a time resource pattern, a modulation and coding scheme (MCS), a TA (timing advance) indication, and a group destination ID.

FIG. 15 illustrates a downlink control information transmission method for sidelink communication between UEs in a wireless communication system supporting sidelink communication.

First, a PSCCH resource pool and/or PSSCH resource pool related to sidelink is configured by a higher layer (step 1).

Thereafter, a BS transmits information on the PSCCH resource pool and/or PSSCH resource pool to a sidelink UE through higher layer signaling (e.g., RRC signaling) (step 2).

Thereafter, the BS transmits control information related to the transmission of a PSCCH (i.e., SCI format 0) and/or the transmission of a PSSCH (i.e., sidelink communication data) individually or together to a sidelink transmitter UE through the DCI format 5 (step 3). The control information includes scheduling information of the PSCCH and/or PSSCH in the PSCCH resource pool and/or PSSCH resource pool. For example, resource allocation information, an MCS level, a time resource pattern, etc. may be included in the control information.

Thereafter, the sidelink transmitter UE transmits the PSCCH (i.e., SCI format 0) and/or PSSCH (i.e., sidelink communication data) to a sidelink receiver UE based on the information received in step 3. In this case, the transmission of the PSCCH and the transmission of the PSSCH may be performed together, or the transmission of the PSSCH may be performed after the transmission of the PSCCH.

Meanwhile, although not shown in FIG. 15, the sidelink transmitter UE may request the BS a transmission resource (i.e., PSSCH resource) for sidelink data, and the BS may schedule resources for the transmission of the PSCCH and the PSSCH. To this end, the sidelink transmitter UE transmits a scheduling request (SR) to the BS, and a buffer status report (BSR) procedure may be performed in which information on the amount of resources requested by the sidelink transmitter UE is provided to the BS.

Sidelink receiver UEs may monitor a control information pool. When control information related to themselves is decoded, the sidelink receiver UEs may selectively decode sidelink data transmission related to the corresponding control information.

In contrast, Mode 2/Mode 4 refers to a method for a UE to randomly select a specific resource in a resource pool in order to transmit data or control information for sidelink communication. In out-of-coverage and/or in-coverage, Mode 2/Mode 4 is applied.

In Mode 2, a resource pool for control information transmission and/or a resource pool for sidelink communication data transmission may be pre-configured or may be semi-statically configured. A UE is provided with a configured resource pool (time and frequency) and selects a resource for sidelink communication transmission in the resource pool. That is, the UE may select a resource for control information transmission in a control information resource pool in order to transmit control information. Furthermore, the UE may select a resource in a data resource pool for the sidelink communication data transmission.

Furthermore, in sidelink broadcast communication, control information is transmitted by a broadcasting UE. The control information indicates the location of a resource for data reception in relation to a physical channel (i.e., PSSCH) that carries sidelink communication data.

Sidelink Synchronization

A sidelink synchronization signal/sequence (sidelink SS) may be used for a UE to obtain time-frequency synchronization. In particular, in the case of out of coverage of a network, control of a BS is impossible. Thus, a new signal and procedure for synchronization establishment between UEs may be defined.

A UE that periodically transmits a sidelink synchronization signal may be referred to as a sidelink synchronization source.

Each UE may have multiple physical-layer sidelink synchronization identities (IDs). A predetermined number (e.g., 336) of physical layer sidelink synchronization identities are defined for sidelink.

A sidelink synchronization signal includes a primary sidelink synchronization signal (PSSS) and a secondary sidelink synchronization signal (SSSS).

Before transmitting a sidelink synchronization signal, a UE may discover a sidelink synchronization source. Furthermore, when the sidelink synchronization source is discovered, the UE may obtain time-frequency synchronization through the received sidelink synchronization signal from the discovered sidelink synchronization source. Furthermore, the corresponding UE may transmit a sidelink synchronization signal.

Furthermore, a channel for delivering system information used for communication between UEs and synchronization-related information along with synchronization may be necessary. The channel may be referred to as a physical sidelink broadcast channel (PSBCH).

V2X communication includes communication between a vehicle and all entities, such as vehicle-to-vehicle (V2V) referring to communication between vehicles, vehicle to infrastructure (V2I) referring to communication between a vehicle and an eNB or road side unit (RSU), vehicle-to-pedestrian (V2P) referring to communication between a vehicle and a UE owned by an individual (pedestrian, bicycler, vehicle driver, or passenger), and V2N (vehicle-to-network).

V2X communication may have the same meaning as V2X sidelink or NR V2X or have a broader meaning than V2X sidelink or NR V2X.

V2X communication may be applicable to various services such as forward collision warning, an automatic parking system, cooperative adaptive cruise control (CACC), control loss warning, traffic queue warning, safety warning for vulnerable road users, emergency vehicle alarm, speed warning to a vehicle traveling on a curved road, and traffic flow control.

V2X communication may be provided via a PC5 interface and/or Uu interface. In this case, a wireless communication system supporting V2X communication may include specific network entities for supporting communication between the vehicle and all entities. For example, the network entity may be a BS (eNB), a road side unit (RSU), a UE, or an application server (e.g., traffic safety server).

Furthermore, a UE performing V2X communication may mean a vehicle UE (V-UE), a pedestrian UE, an RSU of BS type (eNB type), an RSU of UE type, or a robot equipped with a communication module, as well as a typical handheld UE.

V2X communication may be performed directly between UEs or through the network entity(s). V2X operation modes may be classified according to the method of performing V2X communication.

V2X communication is required to support pseudonymity and privacy of a UE using a V2X application so that no operator or third party can track a UE identity in a region where V2X is supported.

Terms used in V2X communication are defined as follows.

RSU (road side unit): An RSU is a V2X service-capable apparatus capable of transmission and reception to and from a moving vehicle using V2I service. Furthermore, the RSU is a fixed infrastructure entity supporting a V2X application, and may exchange messages with other entities supporting a V2X application. The RSU is a term frequently used in the existing ITS specification. The reason why the term is introduced into 3GPP specification is for enabling the document to be read more easily in the ITS industry. The RSU is a logical entity that combines V2X application logic with the function of a BS (called BS-type RSU) or a UE (called UE-type RSU).

V2I Service: A type of V2X service. It is an entity whose one side belongs to a vehicle and the other side belongs to infrastructure.

V2P Service: A type of V2X service type in which one side is a vehicle and the other side is a device carried by an individual (e.g., a portable device carried by a pedestrian, bicycler, driver, or follow passenger).

V2X Service: A 3GPP communication service type in which a transmission or reception device is related to a vehicle.

V2X enabled UE: A UE supporting V2X service.

V2V Service: A type of V2X service in which both sides of communication are vehicles.

V2V communication range: A direct communication range between two vehicles participating in V2V service.

As described above, there are four types of V2X applications called vehicle-to-everything (V2X): (1) vehicle-to-vehicle (V2V), (2) vehicle-to-infrastructure (V2I), (3) vehicle-to-network (V2N), and (4) vehicle-to-pedestrian (V2P).

Figure 16:
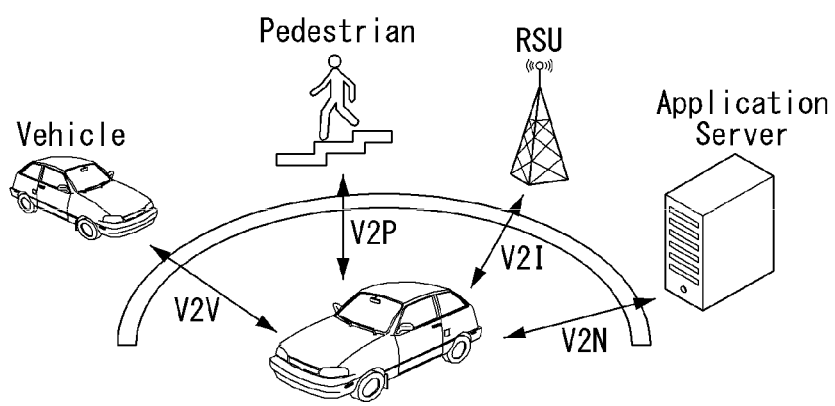
FIG. 16 illustrates the types of V2X applications.

FIG. 16 illustrates the types of V2X applications.

The four types of a V2X application may use "cooperative awareness" providing more intelligent service for the final user. This means that entities, such as a vehicle, a roadside infrastructure, an application server, and a pedestrian, can collect knowledge about their corresponding regional environment (e.g., information received from other adjacent vehicles or sensor devices) so that the entities can process and share the corresponding knowledge in order to provide more intelligent information, such as a cooperative collision warning or autonomous driving.

These intelligent transportation services and the associated message sets are defined in automotive SDOs (Standards Developing Organizations) outside 3GPP.

Three basic classes of applications for providing ITS services: road safety, traffic efficiency, and other applications may be found in, for example, ETSI TR 102 638 V1.1.1: "Intelligent Transport Systems (ITS); Vehicular Communications; Basic Set of Applications; Definitions."

A radio protocol architecture for a user plane for V2X communication and a radio protocol architecture for a control plane for V2X communication may be basically identical to a protocol stack structure for sidelink (see FIG. 38). The radio protocol architecture for the user plane may include a PDCP (Packet Data Convergence Protocol), RLC (Radio Link Control), MAC (Medium Access Control), and a physical layer, and the radio protocol architecture for the control plane may include RRC (radio resource control), RLC, MAC, and a physical layer. A more detailed description of the protocol stack for V2X communication will be given with reference to 3GPP TS 23.303, 3GPP TS 23, 285, 3GPP TS 24.386, etc.

In the following description, the vehicle control device 400 is a separate device provided in the vehicle 700, and may exchange necessary information through data communication. The vehicle control device 400 may include at least some of the units of the vehicle 700. The vehicle control device 400 may be referred to as a control device 400, a driving assistance device 400, a vehicle driving assistance device 400, or an assistance device 400.

Alternatively, at least some of the units of the vehicle control device 400 may be a unit(s) of the vehicle 700 or of another device mounted in the vehicle 700. Such external units may be understood as being included in the vehicle control device 400 by transmitting and receiving data through an interface unit of the vehicle control device 400.

Figure 17:
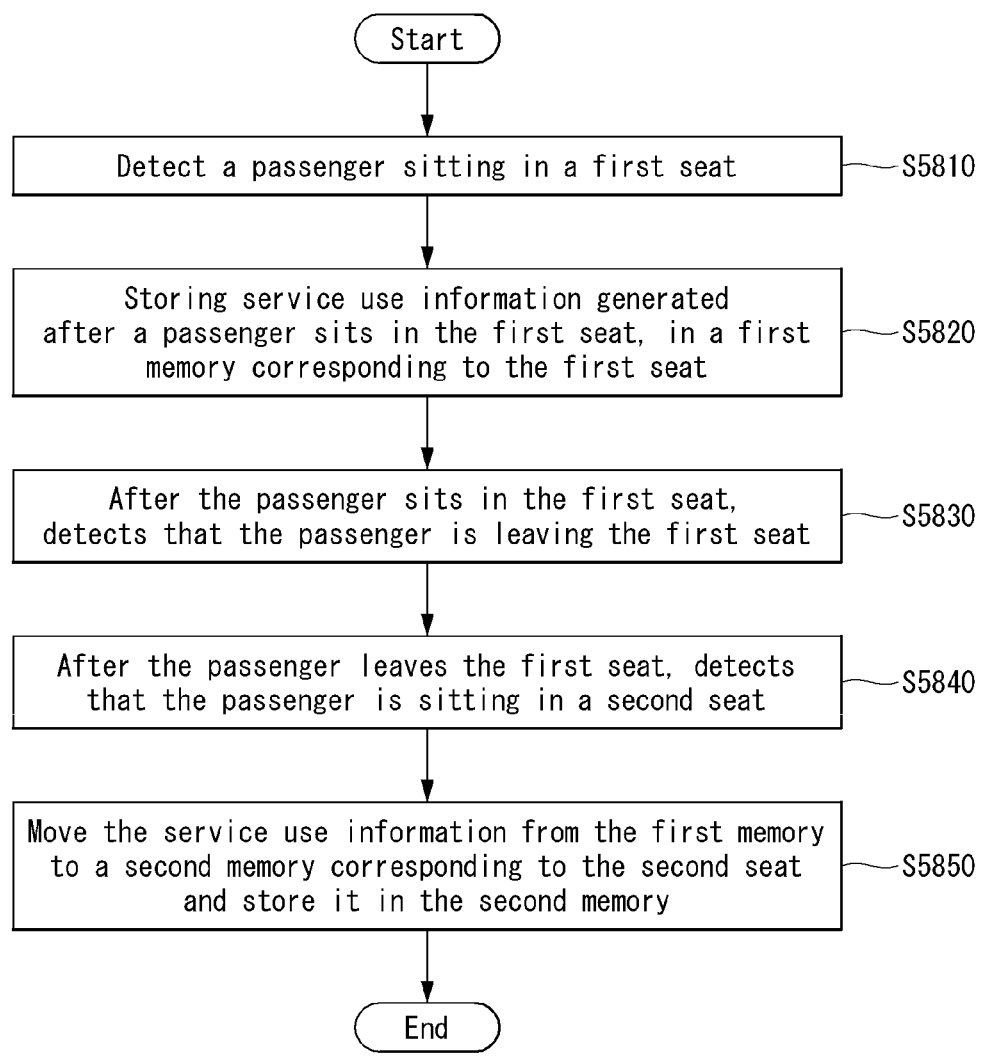
FIGS. 17 to 19 are views showing an embodiment in which service use information is moved as a passenger moves.
Figure 18:
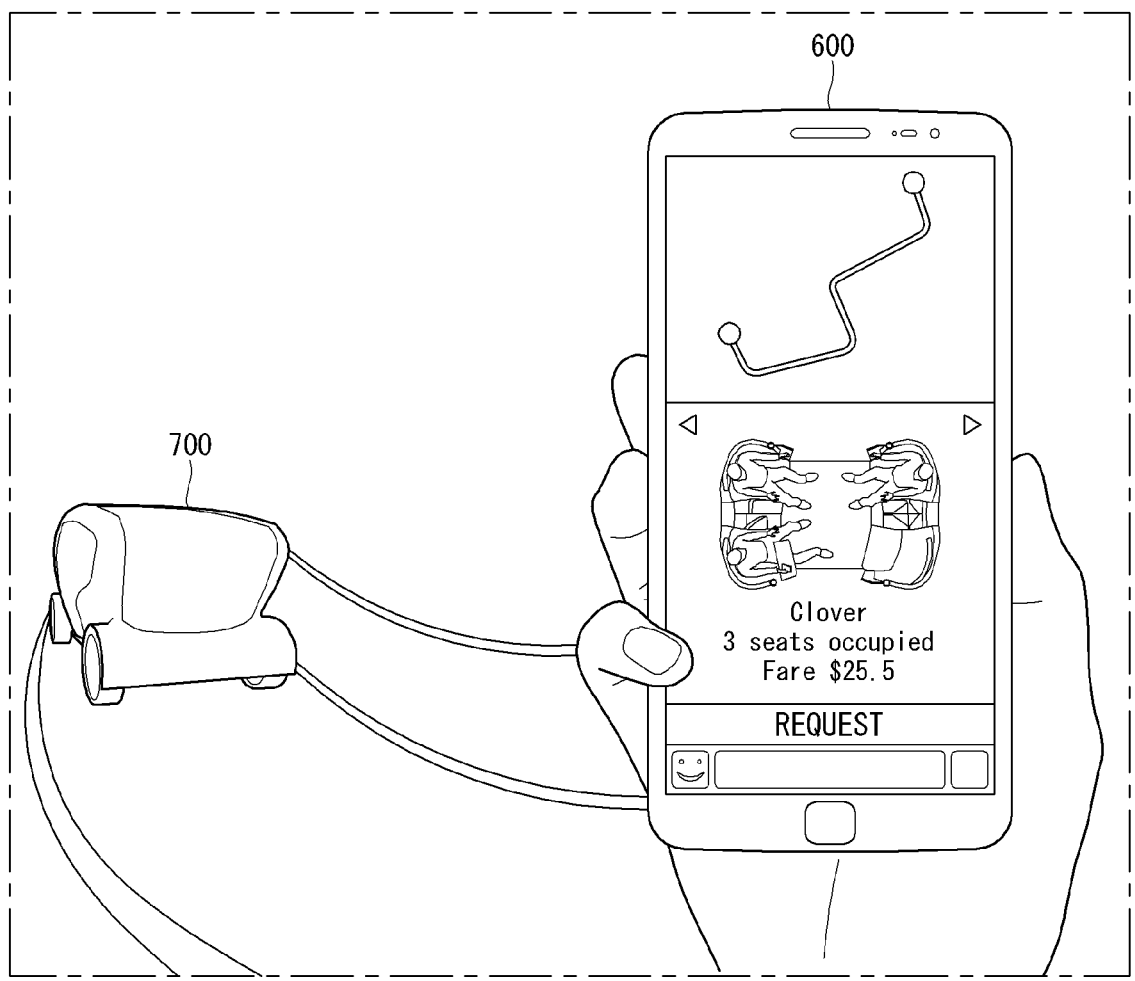
Figure 19:
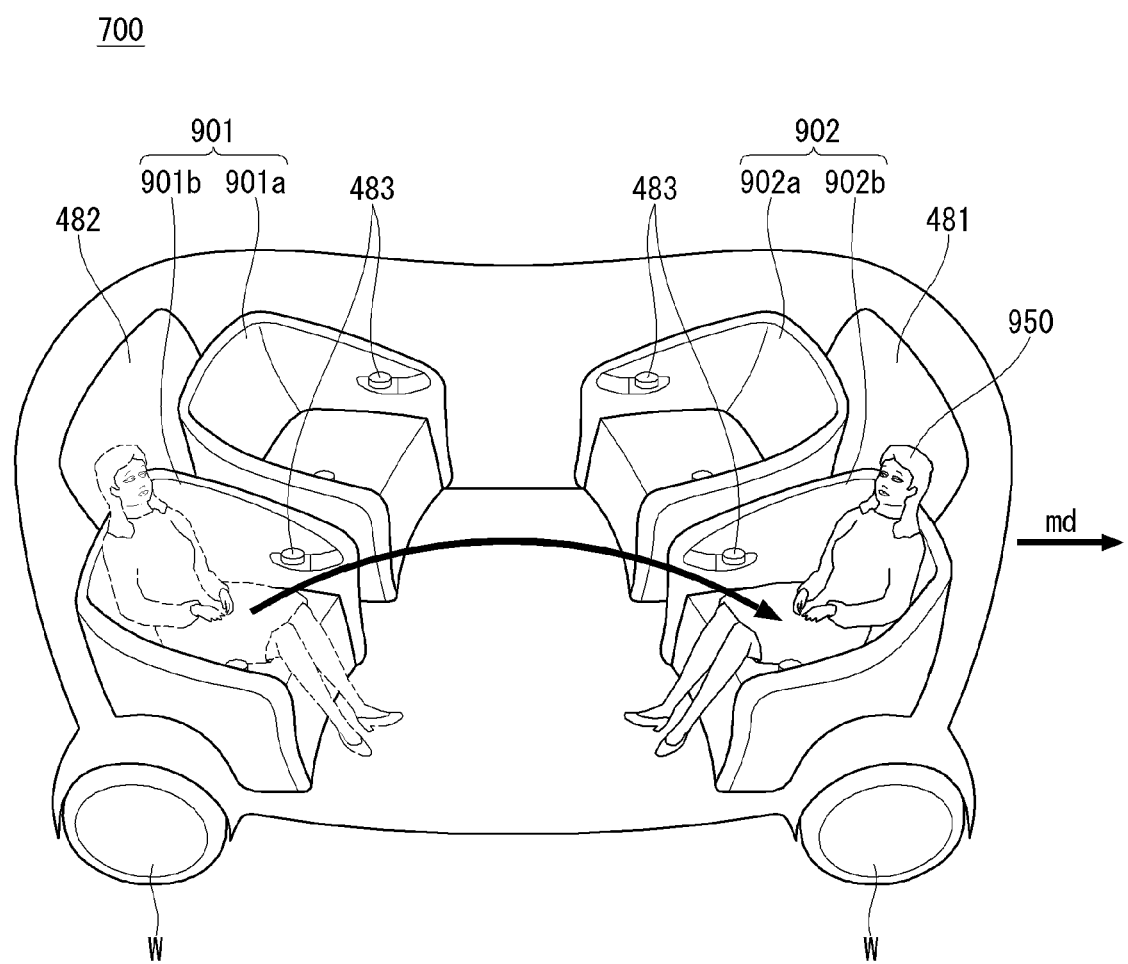

FIGS. 17 to 19 are views showing an embodiment in which service use information is moved as a passenger moves.

Referring to FIG. 17, a processor may detect a passenger sitting in a first seat (S5810). The processor may detect, through the camera 460 for capturing the inside of the vehicle, that a passenger is sitting in the first seat. Alternatively, the processor may detect, through a pressure sensor installed in the first seat, that a passenger is sitting in the first seat. The pressure sensor may detect a pressure exerted by the weight of the passenger when the passenger seats himself or herself. Alternatively, the processor may detect, through a weight sensor installed in the first seat, that a passenger is sitting in the first seat. When a passenger sits in the first seat, the weight sensor may detect the passenger's weight. Alternatively, the processor may detect, through a sensor installed on a safety belt at the first seat, that the passenger is sitting in the first seat. The sensor installed on the safety belt may detect that the safety belt is fastened.

The processor may store service use information generated after a passenger sits in the first seat, in a first memory corresponding to the first seat (S5820). The first memory may be part of the memory 440. The first memory may be installed in the first seat.

The service use information may include at least one of the following: the passenger's profile, the location where the passenger gets in the vehicle, the location where the passenger gets out of the vehicle, the movement path, the history of seat adjustments for the first seat, the history of service use inside the vehicle, the history of product purchases inside the vehicle, the history of payments for paid services, and the history of use of a device installed in the first seat. The device installed in the first seat may be at least one of a display device, an audio output device, an input device, or a product sales device.

After the passenger sits in the first seat, the processor may detect that the passenger is leaving the first seat (S5830). The processor may detect, through the camera 460 for capturing the inside of the vehicle, that the passenger has left the first seat. Alternatively, the processor may detect, through the pressure sensor installed in the first seat, that the passenger has left the first seat. The pressure sensor may detect a change in pressure due to the passenger's weight when the passenger has left the seat. Alternatively, the processor may detect, through the weight sensor installed in the first seat, that the passenger has left the first seat. When the passenger leaves the first seat, the weight sensor may detect a change in the weight exerted on the first seat. Alternatively, the processor may detect, through the sensor installed on the safety belt of the first seat, that the passenger has left the first seat. The processor may detect that the safety belt is unfastened.

After the passenger leaves the first seat, the processor may detect the passenger sitting in a second seat (S5840). The processor may detect, through the camera 460 for capturing the inside of the vehicle, that the passenger is sitting in the second seat. Alternatively, the processor may detect, through a pressure sensor installed in the second seat, that the passenger is sitting in the second seat. The pressure sensor may detect a pressure exerted by the weight of the passenger when the passenger seats himself or herself. Alternatively, the processor may detect, through a weight sensor installed in the second seat, that a passenger is sitting in the second seat. When a passenger sits in the second seat, the weight sensor may detect the passenger's weight. Alternatively, the processor may detect, through a sensor installed on a safety belt at the second seat, that the passenger is sitting in the second seat. The sensor installed on the safety belt may detect that the safety belt is fastened.

The processor may move the service use information from the first memory to a second memory corresponding to the second seat and store it in the second memory (S5850). The second memory may be part of the memory 440. The second memory may be installed in the second seat.

The service use information may be updated and stored as the passenger uses a service.

Once the service use information is moved to and stored in the second memory, the processor may change the settings of the second seat based on the service use information. For example, the processor may apply a service the passenger purchased in the first seat to the second seat. For example, the processor may store a payment the passenger made in the second seat, subsequently to a payment the passenger made in the first seat.

Referring to FIG. 18, the vehicle 700 may drive autonomously. Driving modes of the vehicle 700 may include a manual driving mode, a semi-autonomous driving mode, an autonomous driving mode, etc. The manual driving mode may mean that the vehicle 700 is driven by the driver's operation. The autonomous driving mode may mean that the vehicle 700 is driven without the driver's operation. The autonomous driving mode also may be referred to as an automated driving mode. The semi-autonomous driving mode may mean that part of the driving of the vehicle 700 is done by the driver's operation and the rest of the driving of the vehicle 700 is done without the driver's operation. Alternatively, the processor 470 may control the driving of the vehicle 700 taking control of itself. The control of driving may include at least one among steering control of the vehicle 700, acceleration control of the vehicle 700, brake control of the vehicle 700, light control of the vehicle 700, and wiper control of the vehicle 700. Once a passenger takes over control of driving, the driving mode of the vehicle 700 may be changed to the semi-autonomous driving mode or the manual driving mode.

The processor 470 may receive reserved input information from a passenger before the passenger gets in the vehicle 700. The passenger may enter reserved input information in the mobile terminal 600, and the processor 470 may receive the reserved input information from the mobile terminal 600.

The reserved input information may include at least one of the following: whether the passenger consents to take over control of driving, whether the passenger has a driver's license, whether the passenger is drunk, the passenger's driving experience, seat choice information, travel time, the time the passenger gets in the vehicle, the time the passenger gets out of the vehicle, the location where the passenger gets in the vehicle, and the location where the passenger gets out of the vehicle.

Referring to FIG. 19, forward-facing seats 901 and backward-facing seats 920 may be installed relative to the direction (md) of travel of the vehicle 700. For convenience of explanation, the following description will be given on the assumption that the direction (md) of travel of the vehicle 700 is forward and the opposite direction to the direction (md) of travel of the vehicle 700 is backward. The controller 483 may be installed on every seat 901a, 901b, 902a, and 902b. A plurality of displays 481 and 482 may be provided, and may be installed on the front and back of the vehicle 700, respectively. The front display 481 may be installed ahead of the backward-facing seats 902, and the back display 482 may be installed behind the forward-facing seats 901. The displays 481 and 482 may be moved or slid vertically. The front display 481 may display an image toward the back, and the back display 482 may display an image toward the front.

A passenger 950 may move to another seat within the vehicle. For example, the passenger 950 may move from the forward-facing seat 901b to the backward-facing seat 902b. The processor may detect that the passenger 950 has moved to another seat, through at least one of the camera 460 for capturing the inside of the vehicle, a pressure sensor installed in the seat, a seat-occupancy sensor installed in the seat, and a sensor installed on a safety belt installed in the seat.

Figure 20:
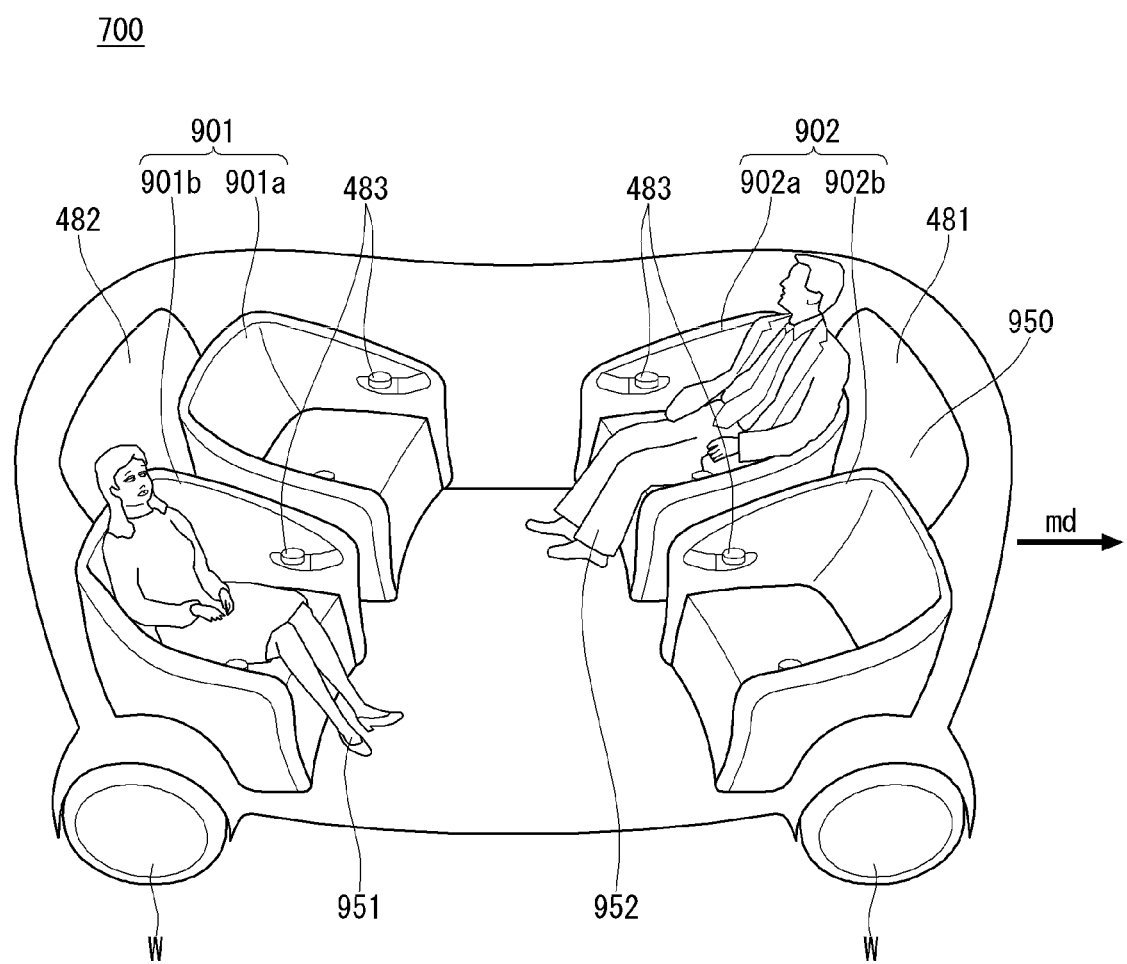
FIGS. 20 to 22 are views showing an embodiment in which a plurality of passengers move to other seats.
Figure 21:
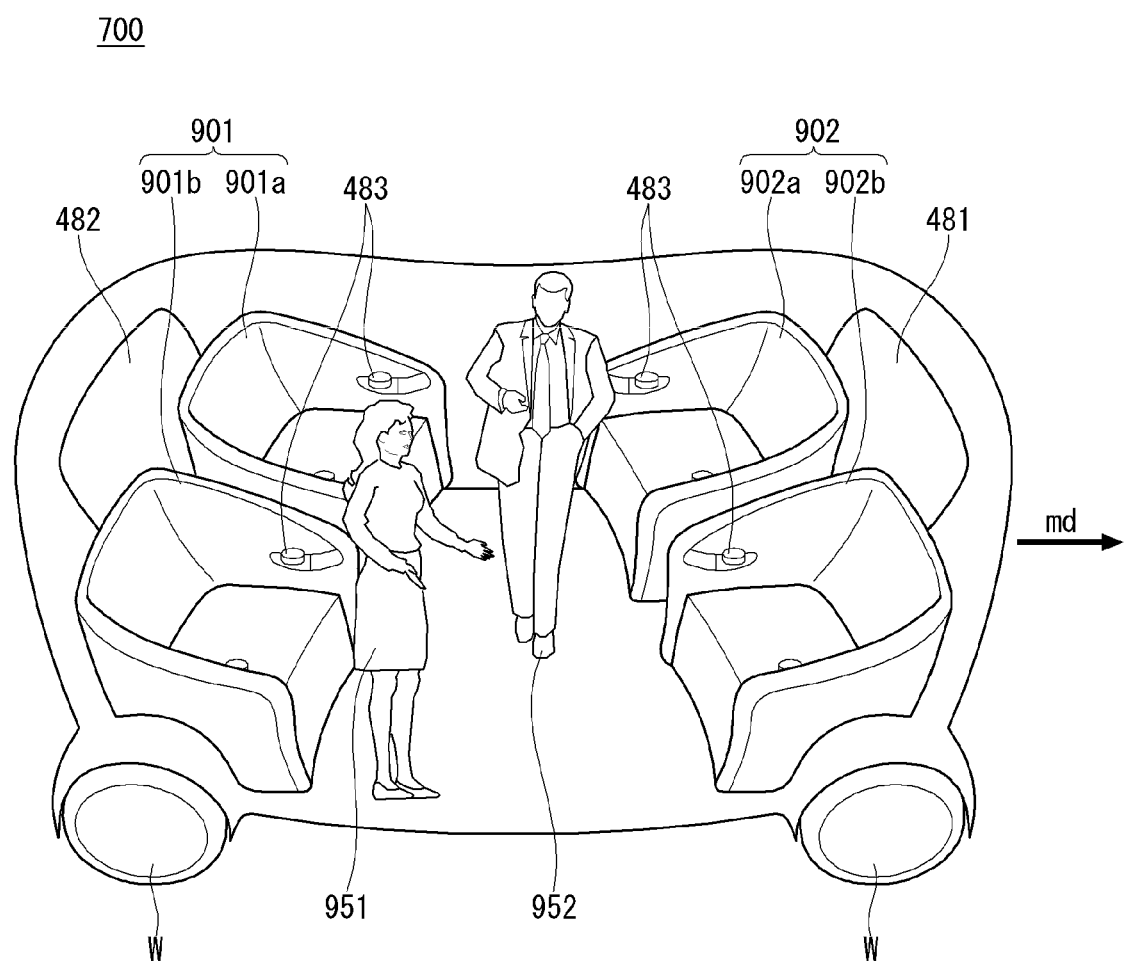
Figure 22:
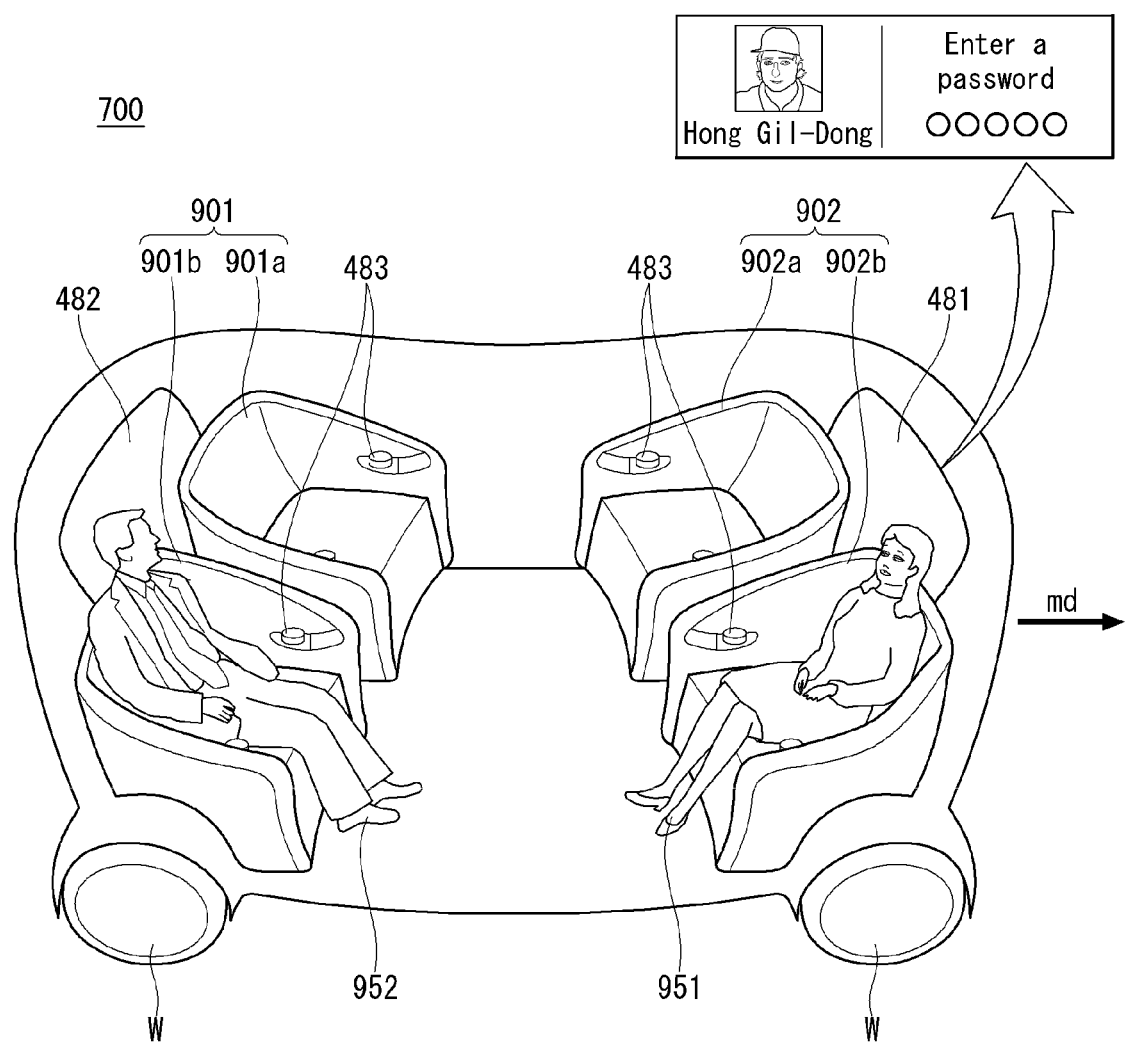

FIGS. 20 to 22 are views showing an embodiment in which a plurality of passengers move to other seats.

Referring to FIG. 20, a plurality of passengers may get into the vehicle, and the plurality of passengers may move to other seats. The processor may detect that a plurality of passengers have left their seat, through at least one of the camera 460 for capturing the inside of the vehicle, a pressure sensor installed in the seat, a seat-occupancy sensor installed in the seat, and a sensor installed on a safety belt installed in the seat.

Referring to FIG. 21, the processor may detect or track the movement of a plurality of passengers through the camera 460 for capturing the inside of the vehicle.

Referring to FIG. 22, a passenger 951 may move from the first seat 901b to the second seat 902b. The processor may detect, through the camera 460 for capturing the inside of the vehicle, that the passenger 951 has moved from the first seat 901b to the second seat 902b. A passenger 952 may move from the third seat 902a to the first seat 901b. The processor may detect, through the camera 460 for capturing the inside of the vehicle, that the passenger 952 has moved from the third seat 902a to the first seat 901b.

If the movement of a passenger is not detected or tracked in a process in which a passenger or a plurality of passengers move to other seats, the processor may perform passenger authentication to recognize a passenger in the seat to which the passenger has moved. The passenger authentication may be performed through a device installed in the seat. Alternatively, the passenger authentication may be performed through the front display 481. Alternatively, the passenger authentication may be performed through a mobile terminal the passenger carries. Through the passenger authentication, the processor may detect which seats the passenger has moved between.

Figure 23:
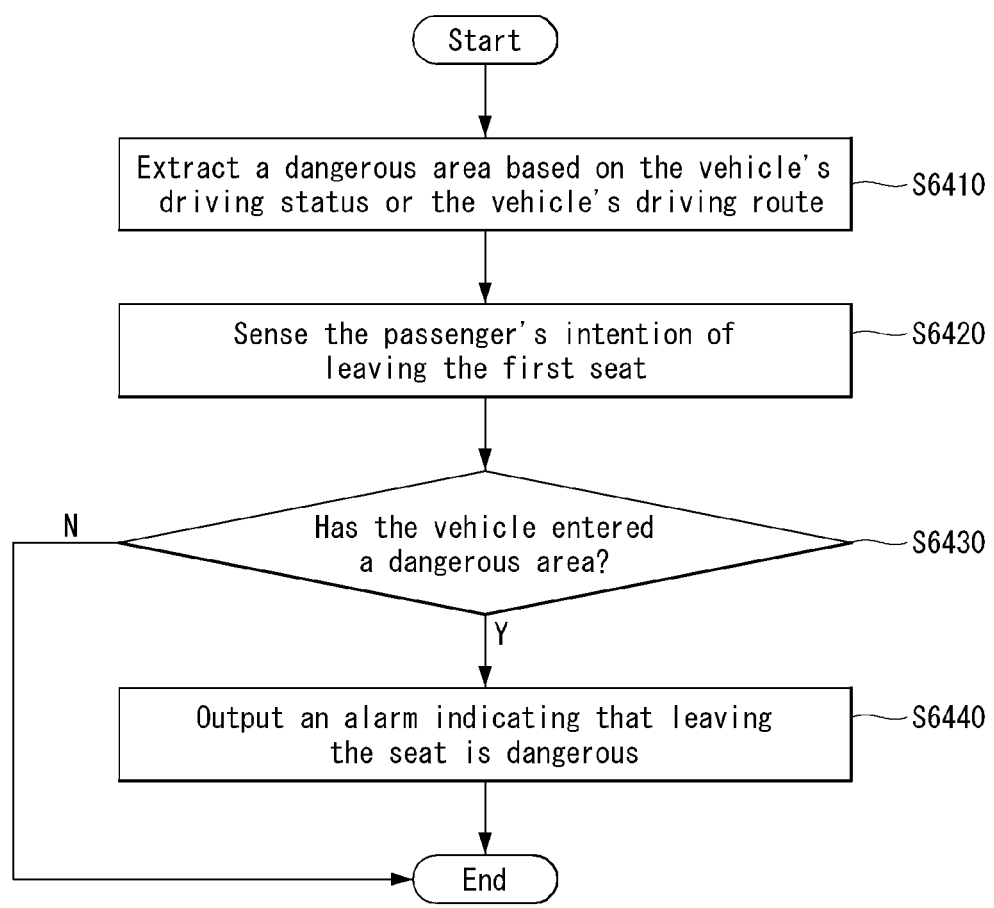
FIGS. 23 and 24 are views showing an embodiment in which a passenger is informed about the risk of leaving their seat based on dangerous areas.
Figure 24:
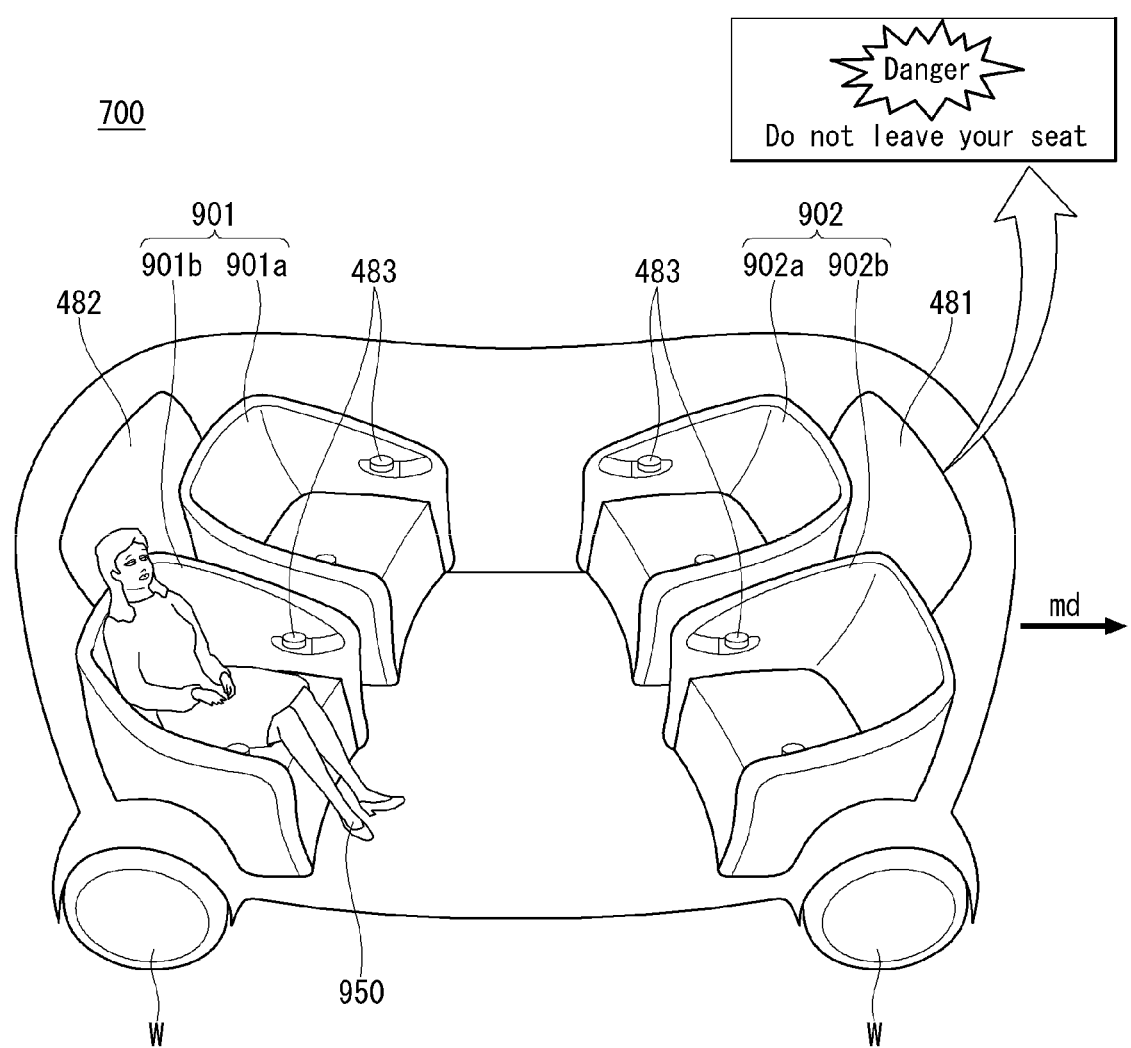

FIGS. 23 and 24 are views showing an embodiment in which a passenger is informed about the risk of leaving their seat based on dangerous areas.

Referring to FIG. 23, the processor may extract a dangerous area based on the vehicle's driving status or the vehicle's driving route (S6410). The dangerous area based on the vehicle's driving status may include at least one of the following: when the vehicle's speed is above a given value, when the vehicle's turn angle, yaw angle, steering wheel angle, or steering angle is above a given value, when the vehicle's pitch is above a given value, and the vehicle's roll angle is above a given value. The dangerous area based on the vehicle's driving route may include at least one of the following: an area with a speed bump on the vehicle's driving route, an area with an uneven surface, an area with a sharp curve, and an area where the speed limit suddenly changes.

The processor may sense the passenger's intention of leaving the seat, through at least one through at least one of the camera 460 for capturing the inside of the vehicle, a pressure sensor installed in the seat, a seat-occupancy sensor installed in the seat, and a sensor installed on a safety belt installed in the seat (S6420). For example, if the passenger is detected bending his or her upper body forward to more than a given angle through the camera 460, the processor may detect that the passenger is about to leave the seat. For example, if the distribution of pressure on the seat is detected as having changed to a predetermined state or the pressure level drops to below a given value through the pressure sensor or seat-occupancy sensor, the processor may detect that the passenger is about to leave the seat. For example, if the safety belt is unfastened, the processor may detect that the passenger is about to leave the seat.

Upon sensing the passenger's intention of leaving the first seat, the processor may determine whether the vehicle has entered the dangerous area (S6430). If it is determined that the vehicle has entered the dangerous area, the processor may output an alarm indicating that leaving the seat is dangerous (S6440). The alarm may be outputted through the displays 481 and 482 inside the vehicle or a device installed on the seat.

Referring to FIG. 24, upon detecting the vehicle entering a dangerous area and sensing the passenger's intention of leaving the seat, the processor may output an alarm. The alarm may be displayed on the front display 481. The front display 481 may output an image indicating that leaving the seat is dangerous.

Figure 25:
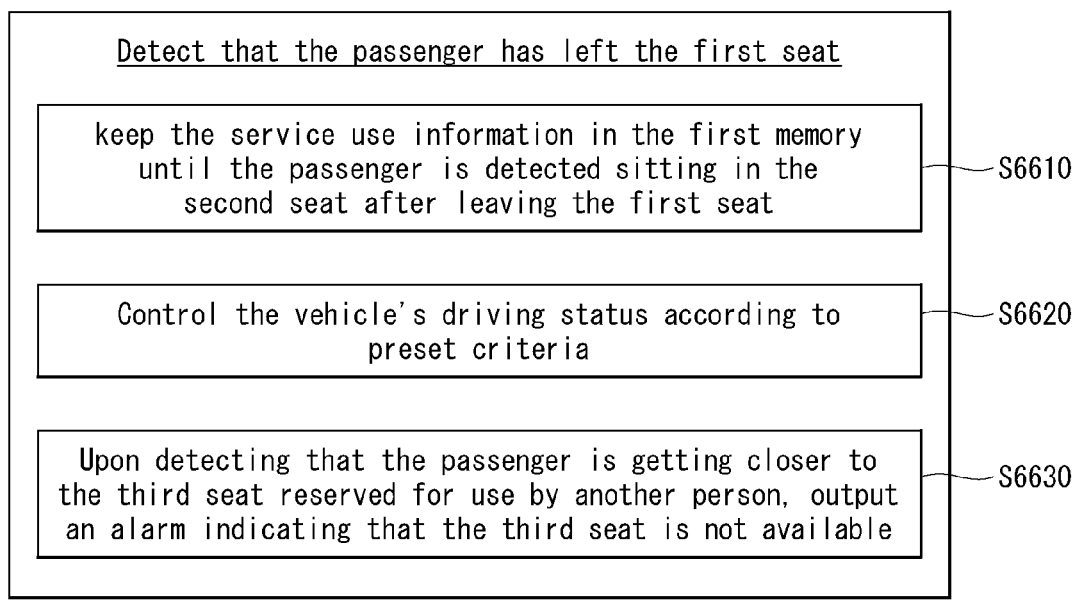
FIGS. 25 and 26 are views showing an embodiment in which the processor performs control after a passenger leaves the seat.
Figure 26:
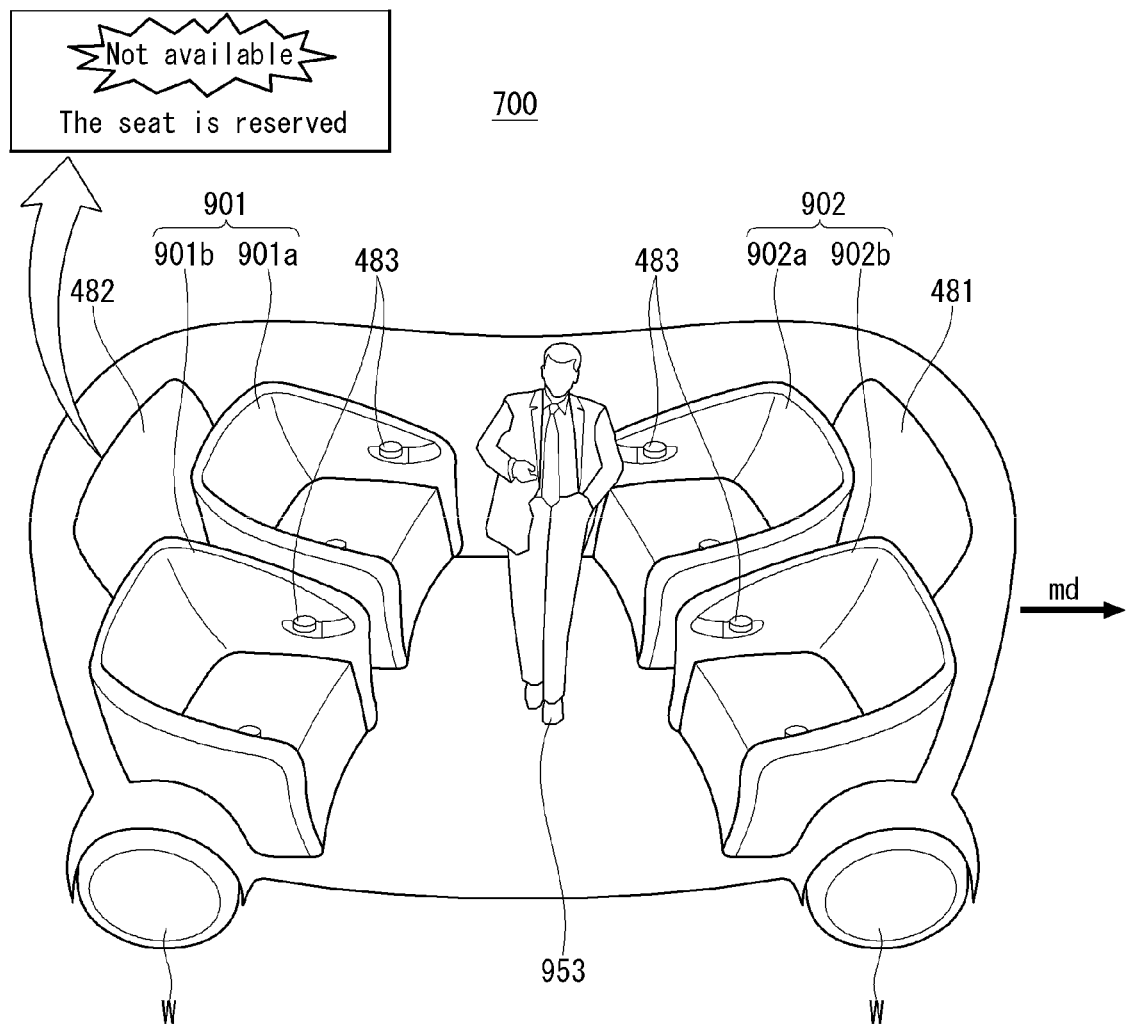

FIGS. 25 and 26 are views showing an embodiment in which the processor performs control after a passenger leaves the seat.

Referring to FIG. 25, upon detecting that the passenger has left the first seat, the processor may keep the passenger's service use information in the first memory until the passenger is detected sitting in the second seat after leaving the first seat (S6610).

Upon detecting that the passenger has left the first seat, the processor may control the vehicle's driving status according to preset criteria (S6620). For example, the processor may control the vehicle to avoid a large change in the vehicle's driving status through control of at least one of the vehicle's speed, acceleration, steering angle, or brake, in order to prevent the passenger from falling after leaving the first seat.

Upon detecting that the passenger has left the first seat and getting closer to the third seat reserved for use by another person, the processor may output an alarm indicating that the third seat is not available (S6630). The alarm may be outputted through the displays 481 and 482 inside the vehicle or a device installed in the seat.

Referring to FIG. 26, a passenger 953 may move closer to the seat 901a reserved by another person. In this case, the processor may display an alarm through the back display 482. The back display 482 may display an image indicating that the seat is reserved and unavailable.

Figure 27:
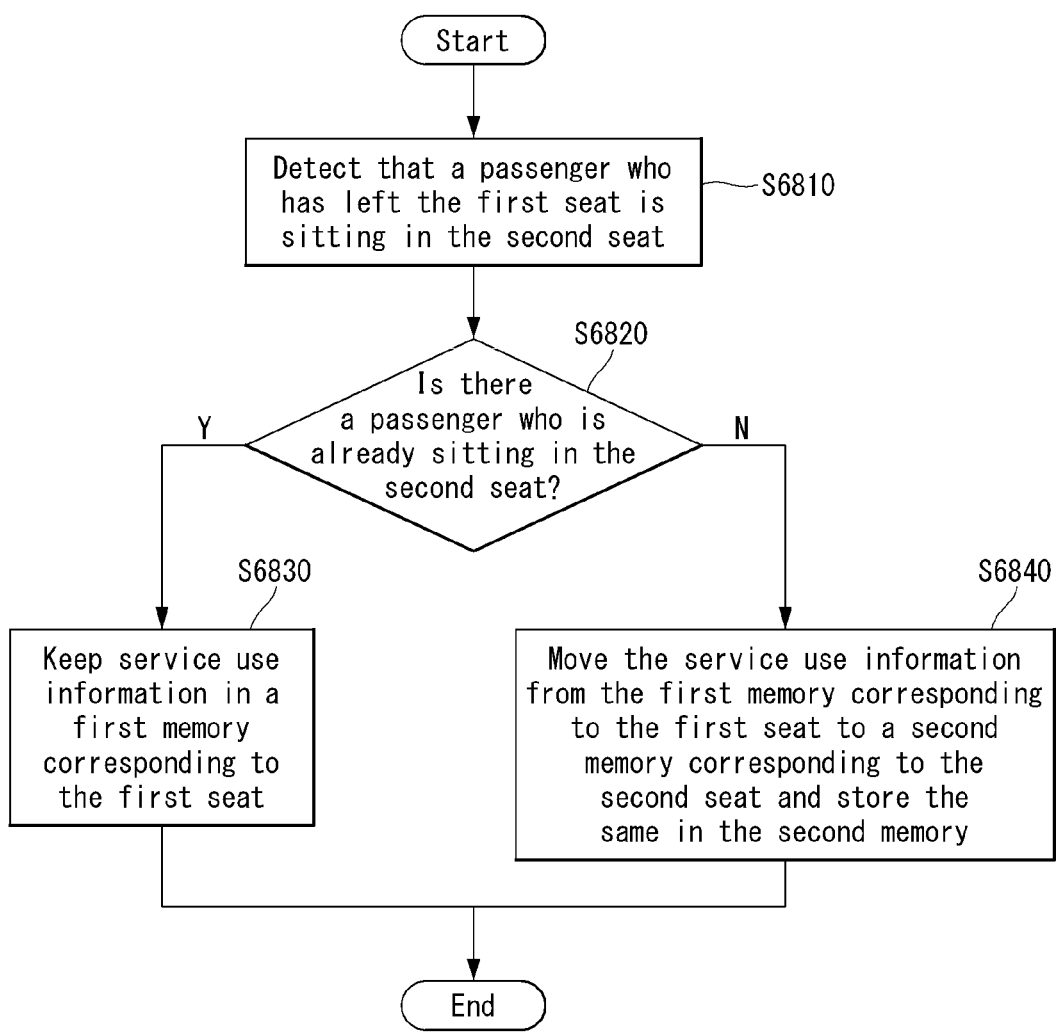
FIGS. 27 to 29 are views showing an embodiment in which the first passenger who has left the first seat sits in the second seat where the second passenger is present.
Figure 28:
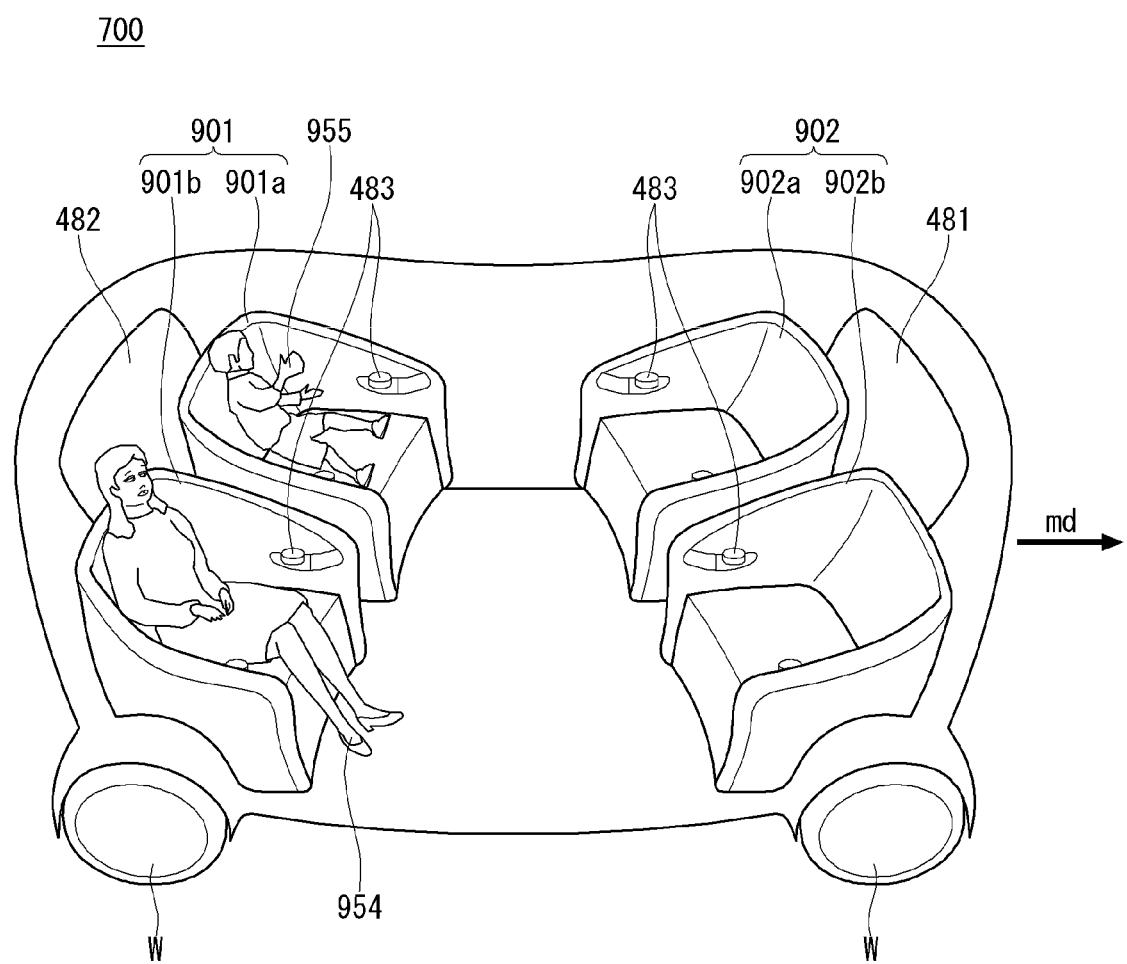
Figure 29:
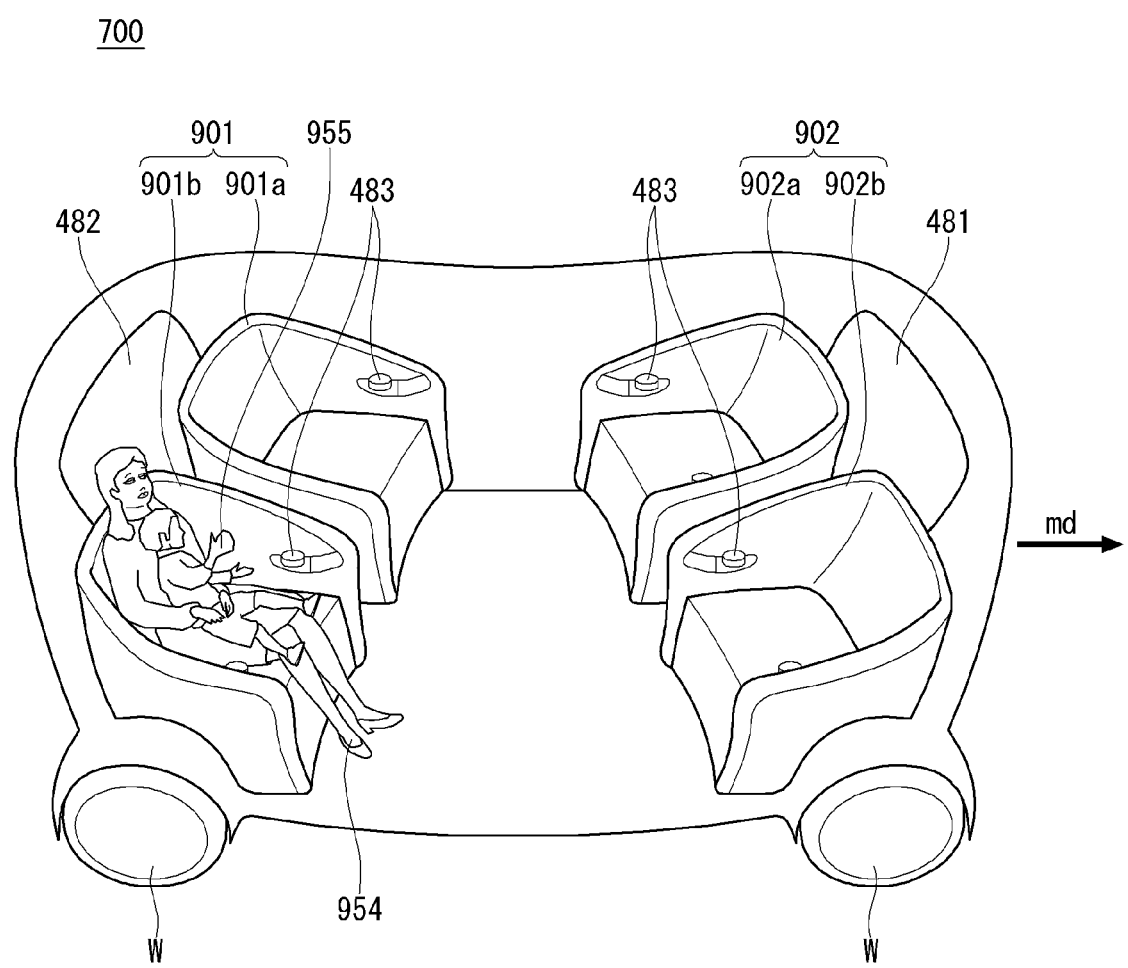

FIGS. 27 to 29 are views showing an embodiment in which the first passenger who has left the first seat sits in the second seat where the second passenger is present.

Referring to FIG. 27, the processor may detect that a passenger who has left the first seat is sitting in the second seat (S6810). The processor may detect that the passenger has moved to the second seat, through at least one of the camera 460 for capturing the inside of the vehicle, a pressure sensor installed in the seat, a seat-occupancy sensor installed in the seat, and a sensor installed on a safety belt installed in the seat.

Before the passenger who has left the first seat sits in the second seat, the processor may determine whether there was a passenger who is already sitting in the second seat (S6820). The processor may detect a passenger who is already sitting in the second seat, through at least one of the camera 460 for capturing the inside of the vehicle, a pressure sensor installed in the seat, a seat-occupancy sensor installed in the seat, or a sensor installed on a safety belt installed in the seat.

Upon detecting a passenger who is already sitting in the second seat, the processor may store and keep service use information generated while the passenger was sitting in the first seat, in a first memory corresponding to the first seat (S6830).

Upon detecting no passenger who is already sitting in the second seat, the processor may store and keep service use information generated while the passenger was sitting in the first seat, in a second memory corresponding to the second seat (S6840). In this case, the processor may store and keep the service use information in the first memory corresponding to the first seat until detecting that the passenger has sat in the second seat.

Referring to FIGS. 28 and 29, a first passenger 955 may sit in the first seat 901a, and a second passenger 954 may sit in the second seat 901b. For example, the first passenger 955 may be an infant or child, and the second passenger 954 may be the infant or child's guardian. The second passenger 954 may move the first passenger 955 to the second seat 901b. For example, the first passenger 955 may be sat on the second passenger 954's lap or held in the second passenger 954's arms.

In this case, the processor may determine that the first passenger 955 has moved temporarily to the second seat 901b. The processor may store and keep service use information generated while the first passenger 955 is sitting in the first seat 901a, in the first memory corresponding to the first seat 901a.

Figure 30:
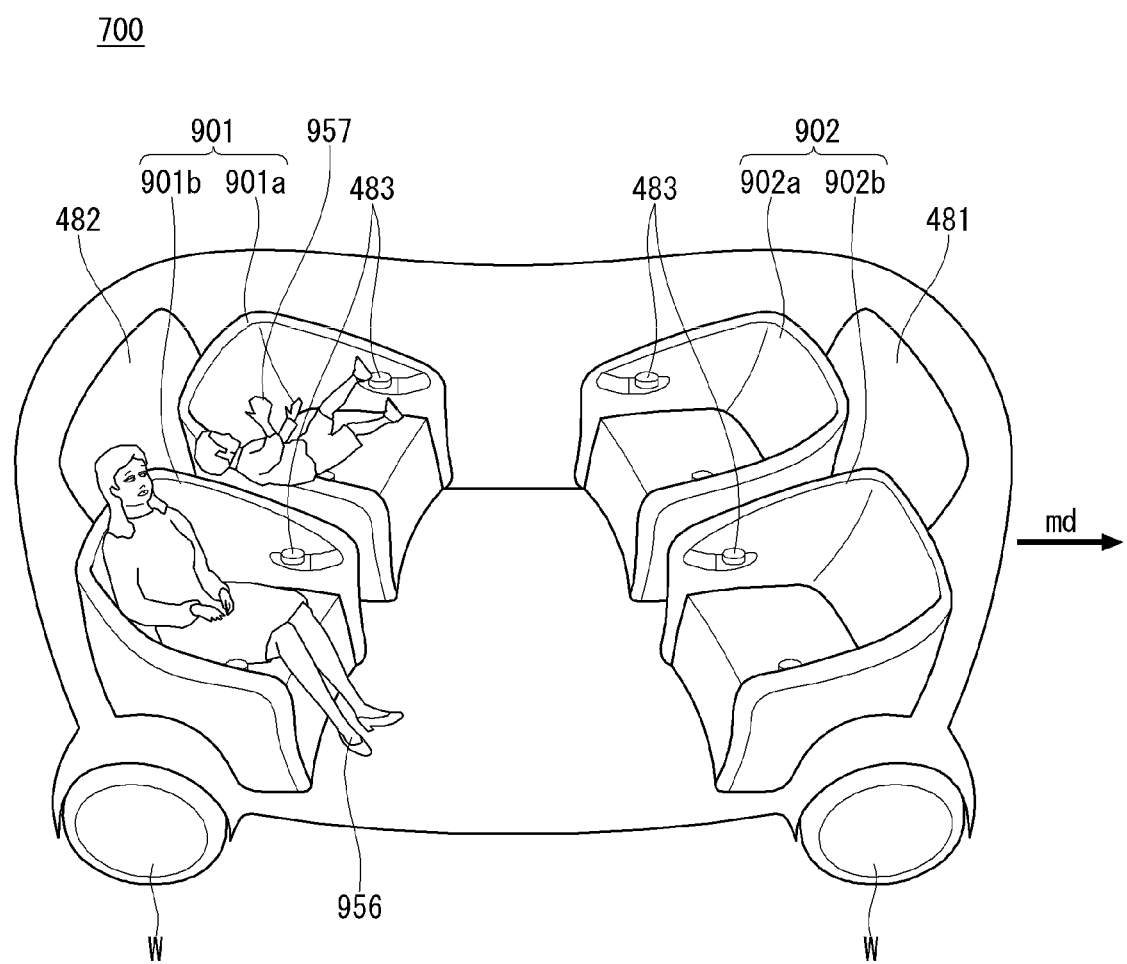
FIGS. 30 to 32 are views showing an embodiment in which, even if a passenger is detected as having left the seat, the service use information is stored and kept in a memory in the seat.
Figure 31:
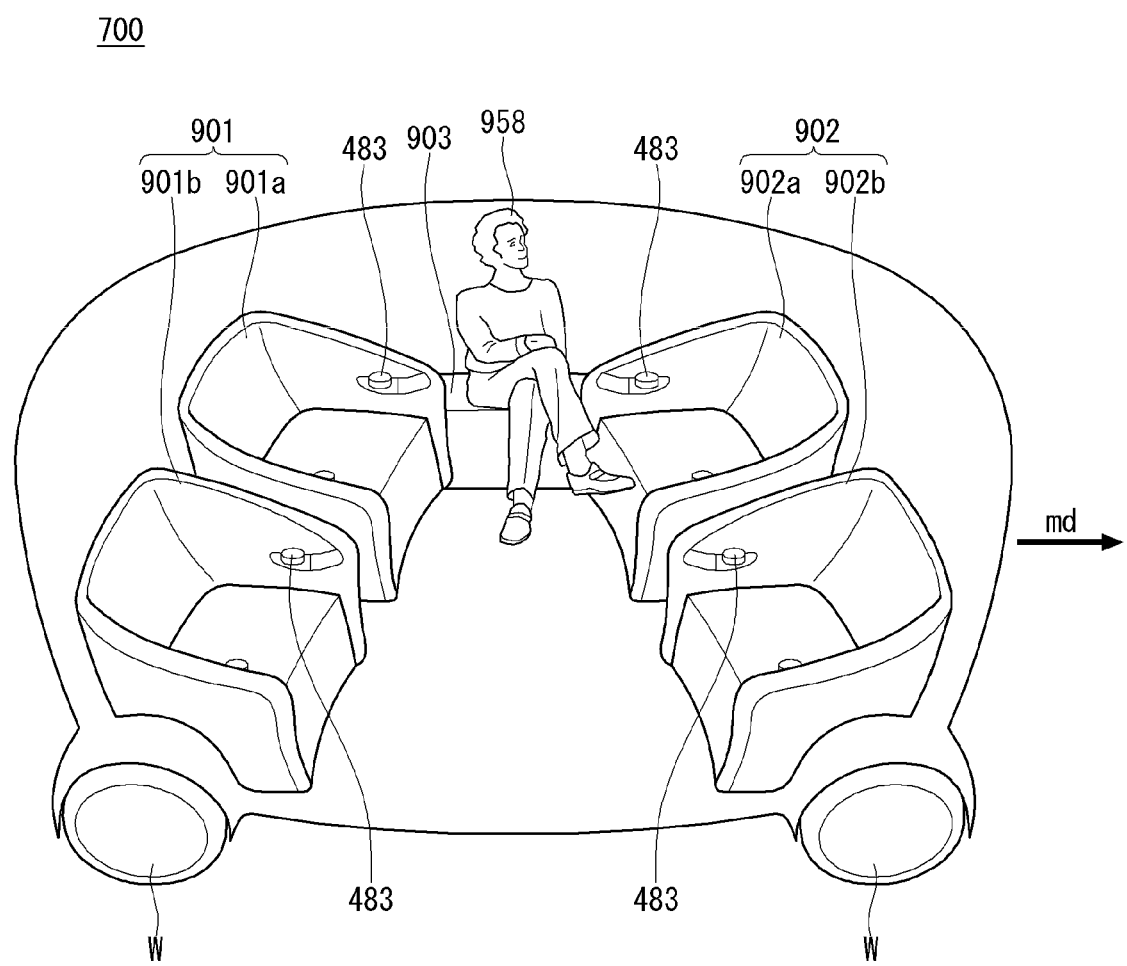
Figure 32:
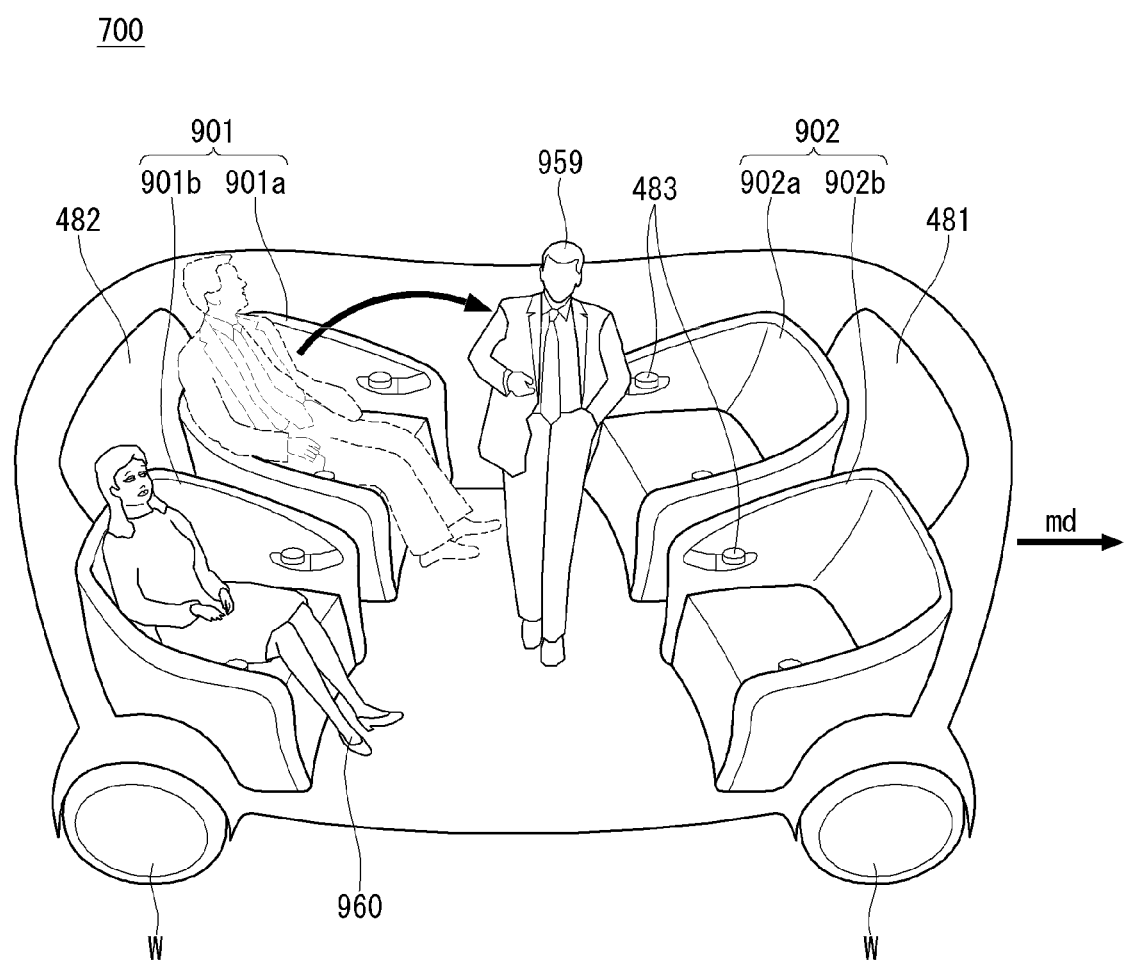

FIGS. 30 to 32 are views showing an embodiment in which, even if a passenger is detected as having left the seat, the service use information is stored and kept in a memory in the seat.

Referring to FIG. 30, a first passenger 957 may change his or her posture, lean on the second passenger 956, or lie on his or her side while sitting in the first seat 901a. In this case, the processor may determine that the first passenger 957 is about to leave the first seat 901a, through a weight sensor, a pressure sensor, a seat-occupancy sensor, or a sensor installed on the safety belt. When the first passenger 957's intention of leaving the first seat 901a is sensed but the first passenger 957 does not leave the first seat 901a for a given period of time, the process may store and keep the first passenger's service use information in a first memory corresponding to the first seat 901a.

Referring to FIG. 31, a passenger 958 may leave the seat 901a and lean or sit on a sidewall in the vehicle. The sidewall inside the vehicle may not be detected as a seat. When the passenger 958 is detected as having left the seat 901a but the passenger 958 does not sit in another seat for a given period of time, the processor may store and keep the passenger 958's service use information in the memory corresponding to the seat 901a.

Referring to FIG. 32, a passenger 959 may leave the seat 901a and stand in the vehicle. When the passenger 959 is detected as having left the seat 901a but the passenger 959 does not sit in another seat for a given period of time, the processor may store and keep the passenger 959's service use information in the memory corresponding to the seat 901a.

An exemplary embodiment of the present invention provides a vehicle control method, which is a method for controlling a vehicle by associating a seat a passenger in the vehicle is sitting in with the passenger's service use information, the vehicle control method including: detecting the passenger sitting in a first seat; storing the service use information generated after the passenger sits in the first seat in a first memory corresponding to the first seat; detecting the passenger leaving the first seat after the passenger sits in the first seat; detecting the passenger sitting in a second seat after the passenger leaves the first seat; and moving the service use information from the first memory to a second memory corresponding to the second seat and storing the same in the second memory, wherein the service use information includes information that is stored in the first memory until the passenger leaves the first seat after sitting in the first seat.

The detecting of the passenger sitting in the first seat may be performed through at least one of a camera for capturing the inside of the camera, a pressure sensor installed in the first seat, a weight sensor installed in the first seat, and a sensor installed on a safety belt installed in the seat.

The service use information may include at least one of the following: the passenger's profile, the location where the passenger gets in the vehicle, the location where the passenger gets out of the vehicle, the movement path, the history of seat adjustments for the first seat, the history of service use inside the vehicle, the history of product purchases inside the vehicle, the history of payments for paid services, and the history of use of a device installed in the first seat.

The service use information may be updated and stored as the passenger uses a service.

The vehicle control method may further include: extracting a dangerous area based on the vehicle's driving status or the vehicle's driving route; and upon detecting that the passenger has left the first seat and the vehicle has entered the dangerous area, outputting an alarm indicating that leaving the seat is dangerous.

The vehicle control method may further include, upon detecting that the passenger has left the first seat, controlling the vehicle's driving status according to preset criteria The preset criteria may include at least one of the vehicle's speed control, the vehicle's acceleration control, and the vehicle's brake control.

In the vehicle control method, the detecting of the passenger sitting in a second seat after the passenger leaves the first seat may further include performing authentication to ensure that the passenger sitting in the second seat is the same passenger who has left the first seat.

The authentication may be performed through at least one of the camera for capturing the inside of the vehicle, a display device installed on the second seat, and a mobile terminal.

The vehicle control method may further include changing the settings of the second seat based on the service use information.

The vehicle control method may further include, upon detecting that the passenger has left the first seat and is getting closer to a third seat reserved for use by another person, outputting an alarm indicating that the third seat is not available.

The vehicle control method may further include, upon detecting a passenger who is already sitting in the second seat and detecting that the passenger who has left the first seat is sitting in the second seat, keeping the service use information in the first memory.

The vehicle control method may further include, after detecting that the passenger has left the first seat, keeping the service use information in the first memory until the passenger is detected sitting in the second seat.

The vehicle control device according to the foregoing exemplary embodiment may enhance passengers' convenience. The vehicle control device according to the foregoing exemplary embodiment may be used during autonomous driving or semi-autonomous driving of a vehicle.

The features, structures, and effects described in the above embodiments are included in at least one embodiment of the present invention, and are not necessarily limited to only one embodiment. Moreover, the features, structures, and effects described in the embodiments may also be combined or modified to be carried out in other embodiments by those skilled in the art to which the embodiments pertain. Thus, the contents related to the combination and modification shall be construed to be included in the scope of the present invention.

Further, although the embodiments have been mainly described until now, they are just exemplary and do not limit the present invention. Thus, those skilled in the art to which the present invention pertains will know that various modifications and applications which have not been exemplified may be carried out within a range which does not deviate from the essential characteristics of the embodiments. For example, the constituent elements described in detail in the exemplary embodiments can be modified to be carried out. Further, the differences related to such modifications and applications shall be construed to be included in the scope of the present invention specified in the attached claims.

The invention claimed is:

1. A method for controlling a vehicle by associating a passenger sitting on a seat of the vehicle with the passenger's service use information, the method comprising:
   detecting the passenger sitting in a first seat;
   storing the service use information generated after the passenger sits in the first seat in a first computer-readable memory corresponding to the first seat;

detecting the passenger leaving the first seat after the passenger sits in the first seat;

based on detecting that the passenger, after having left the first seat, is sitting on a second seat which is unoccupied: moving the service use information from the first computer-readable memory to a second computer-readable memory corresponding to the second seat, and storing the service use information in the second computer-readable memory; and based on detecting that the passenger, after having left the first seat, is sitting on a third seat which has been occupied by a second passenger other than the passenger: keeping the service use information in the first computer-readable memory, wherein the service use information comprises information that is stored in the first computer-readable memory until the passenger leaves the first seat after sitting in the first seat.

2. The method of claim 1, wherein the detecting of the passenger sitting in the first seat is performed through at least one of a camera for capturing the inside of the vehicle, a pressure sensor installed in the first seat, a weight sensor installed in the first seat, or a sensor installed on a safety belt installed in the first seat.

3. The method of claim 1, wherein the service use information comprises at least one of: the passenger's profile, a location where the passenger gets in the vehicle, a location where the passenger gets out of the vehicle, a movement path, a history of seat adjustments for the first seat, a history of service use inside the vehicle, a history of product purchases inside the vehicle, a history of payments for paid services, or a history of use of a device installed in the first seat.

4. The control method of claim 1, wherein the service use information is updated and stored as the passenger uses a service.

5. The method of claim 1, further comprising:

extracting information regarding a dangerous area based on the vehicle's driving status or the vehicle's driving route; and upon detecting that the passenger has left the first seat and the vehicle has entered the dangerous area, outputting an alarm indicating that leaving the seat is dangerous.

6. The method of claim 1, further comprising, upon detecting that the passenger has left the first seat, controlling the vehicle's driving status according to preset criteria.

7. The method of claim 6, wherein the preset criteria comprise at least one of the vehicle's speed control, the vehicle's acceleration control, or the vehicle's brake control.

8. The method of claim 1, further comprising performing authentication for the passenger.

9. The method of claim 8, wherein the authentication is performed through at least one of a camera for capturing the inside of the vehicle, or a mobile terminal.

10. The method of claim 1, further comprising changing at least one setting of the second seat based on the service use information.

11. The method of claim 1, further comprising: based on detecting that the passenger has left the first seat and is getting closer to a fourth seat reserved for use by another person, outputting an alarm indicating that the third seat is not available.

12. The method of claim 1, further comprising, after detecting that the passenger has left the first seat, keeping the service use information in the first computer-readable memory until the passenger is detected sitting in the second seat or the third seat.

* * * * *